April 14, 1931.   H. L. YOUNG   1,800,332
BLANK FORMING AND MANIPULATING APPARATUS
Filed Jan. 8, 1926    17 Sheets-Sheet 7
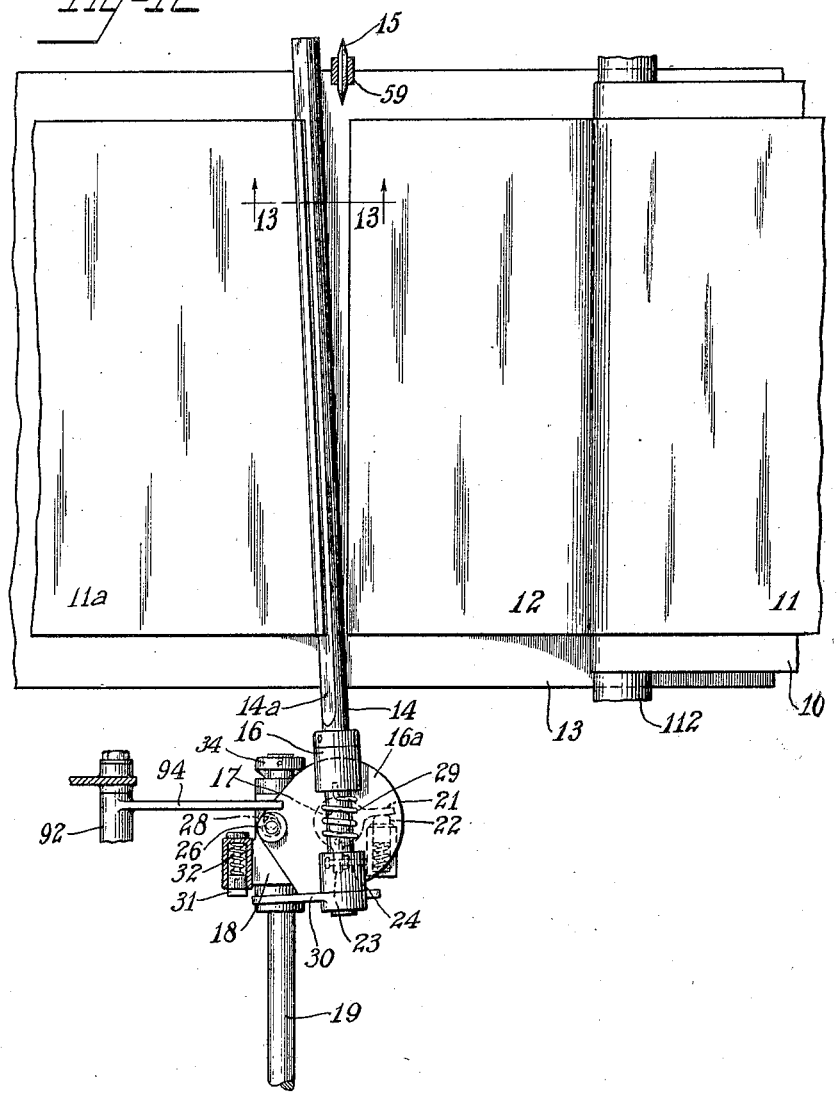
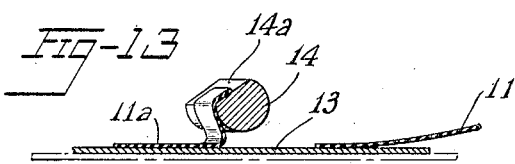

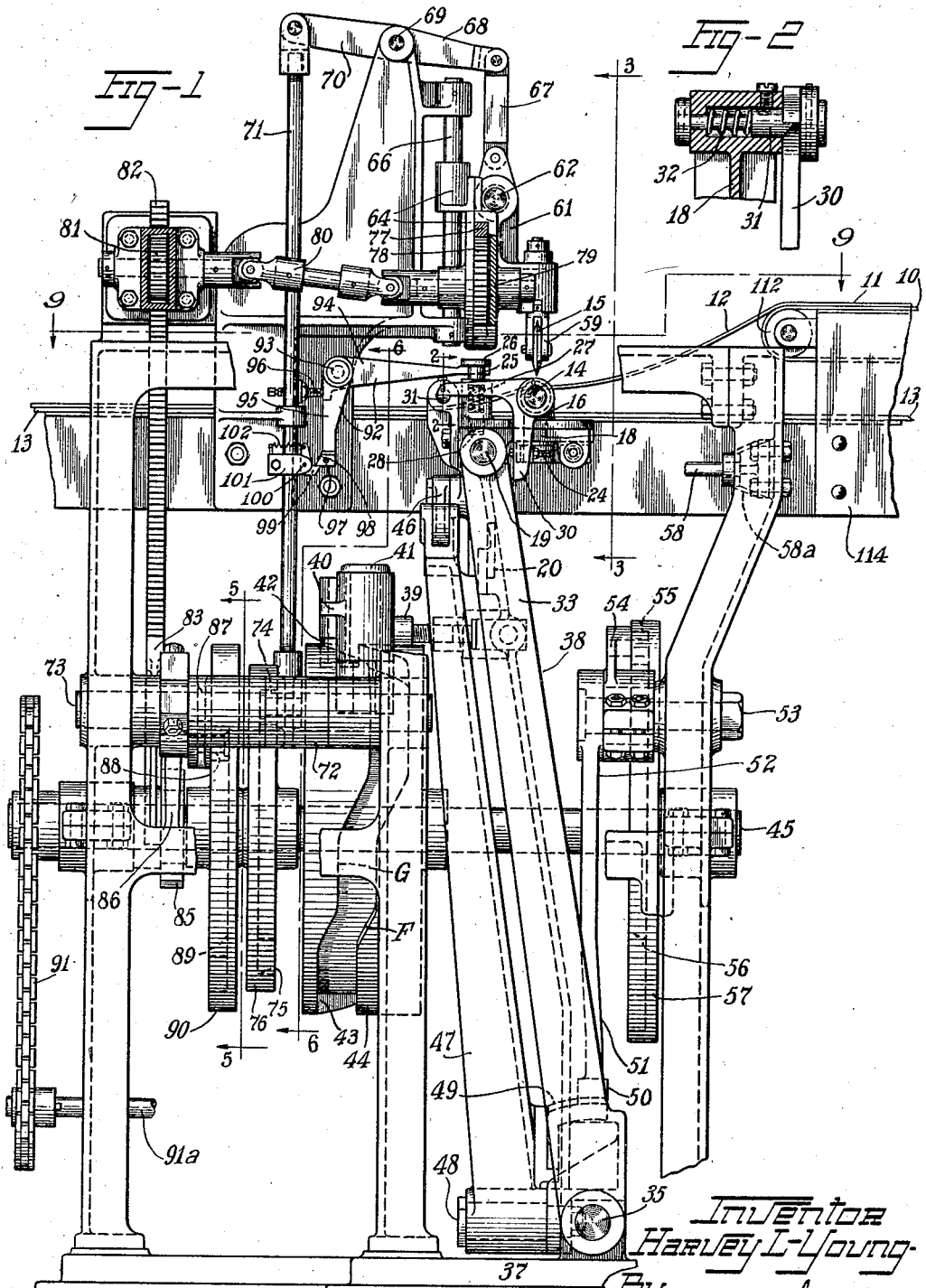

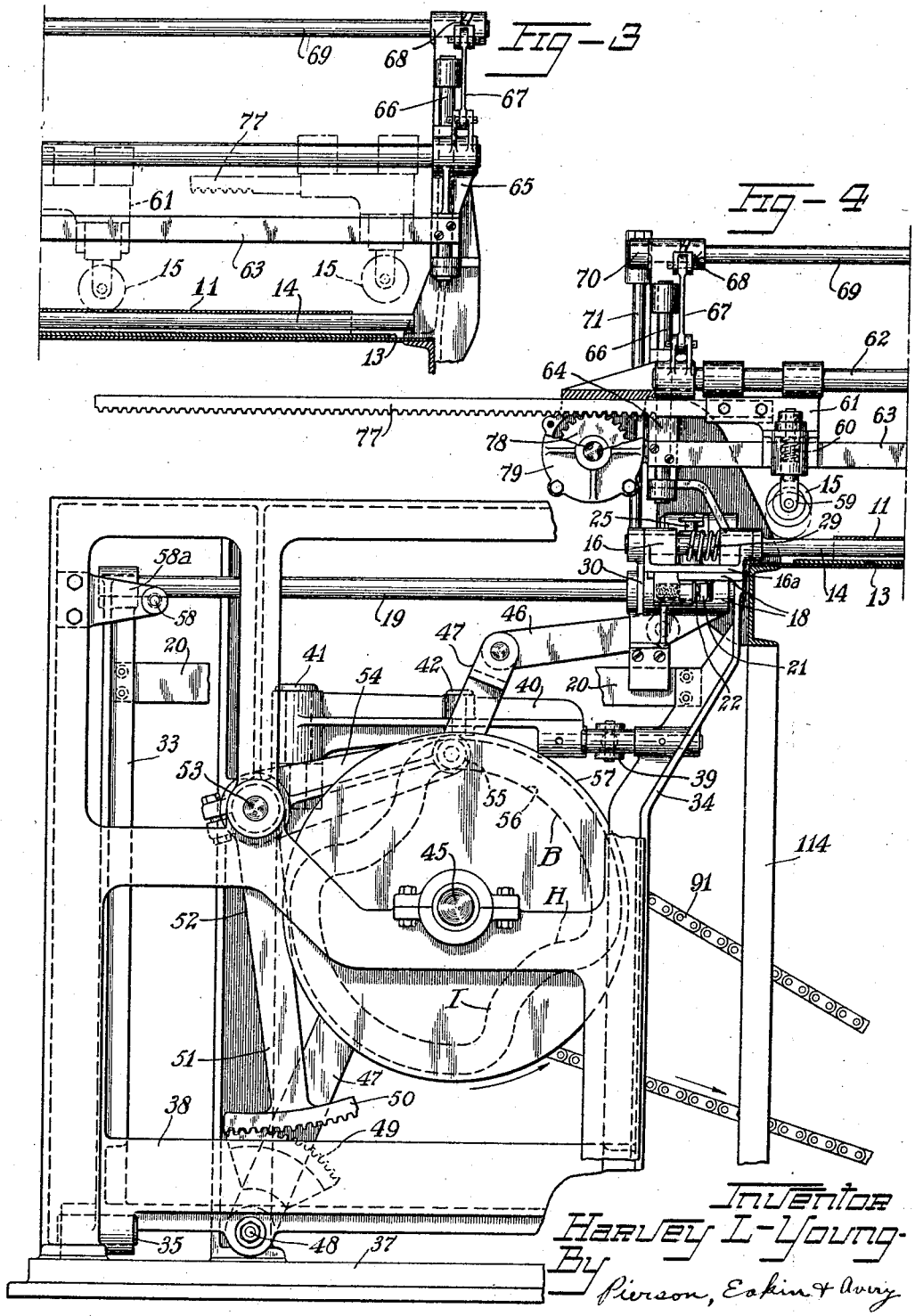

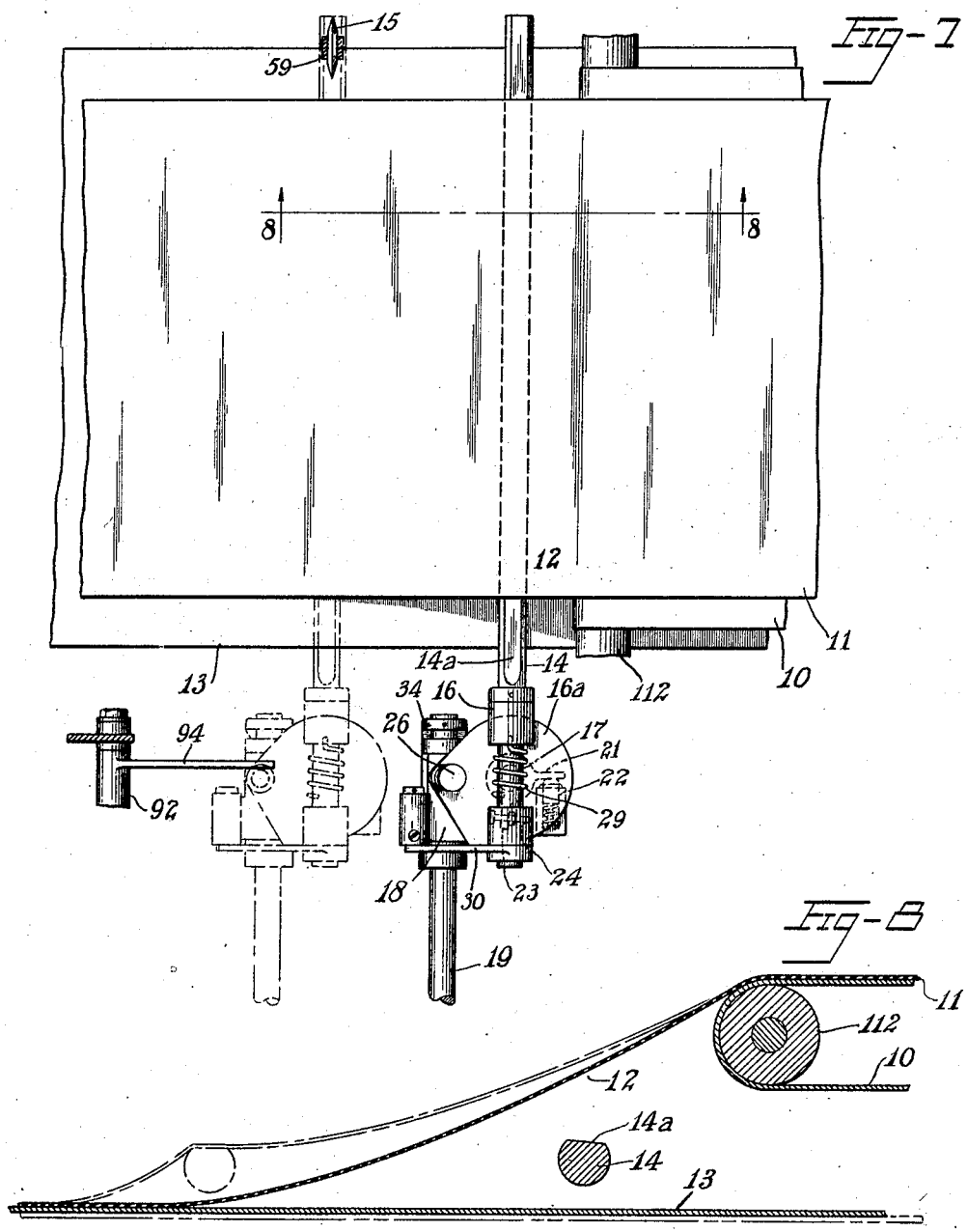

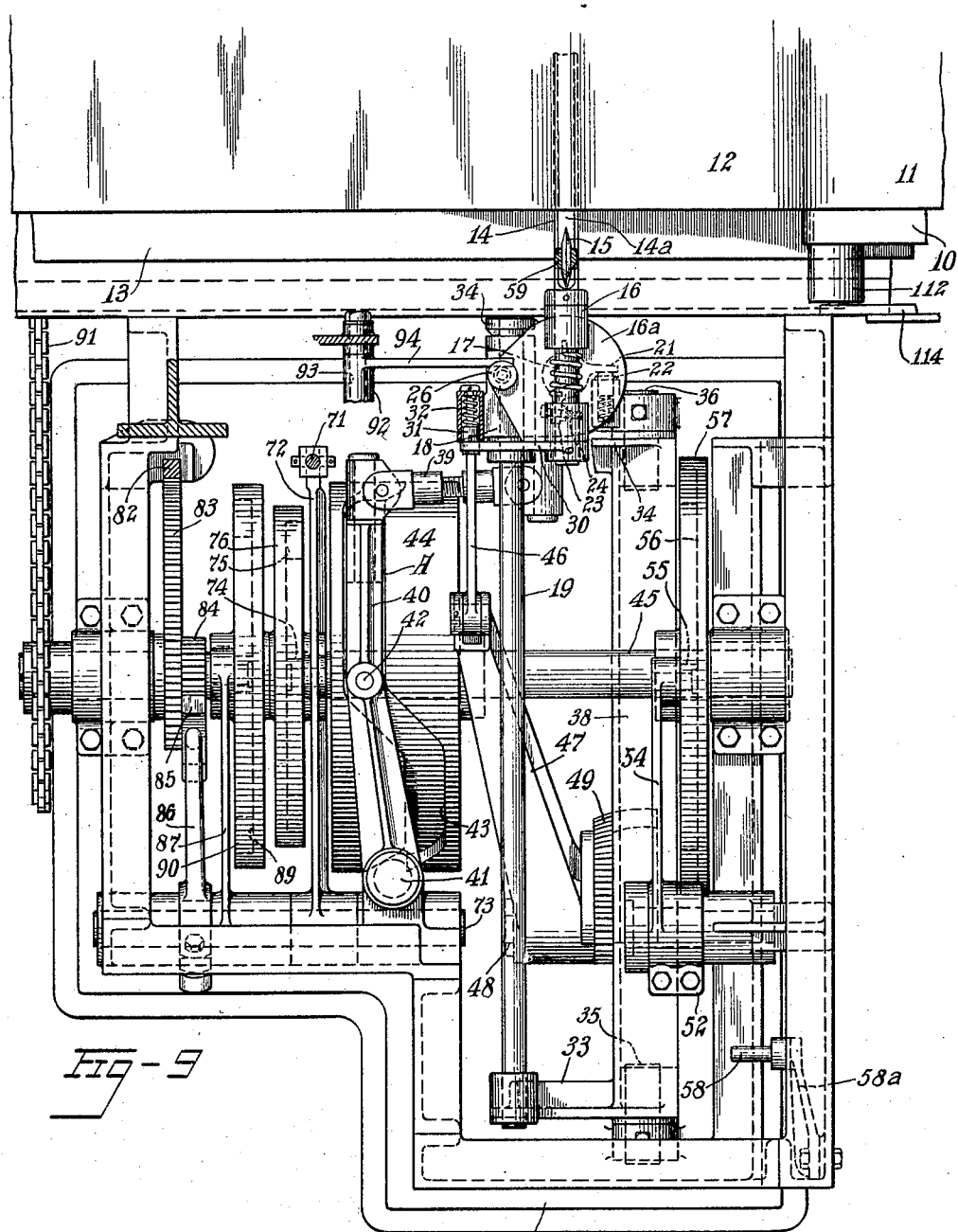

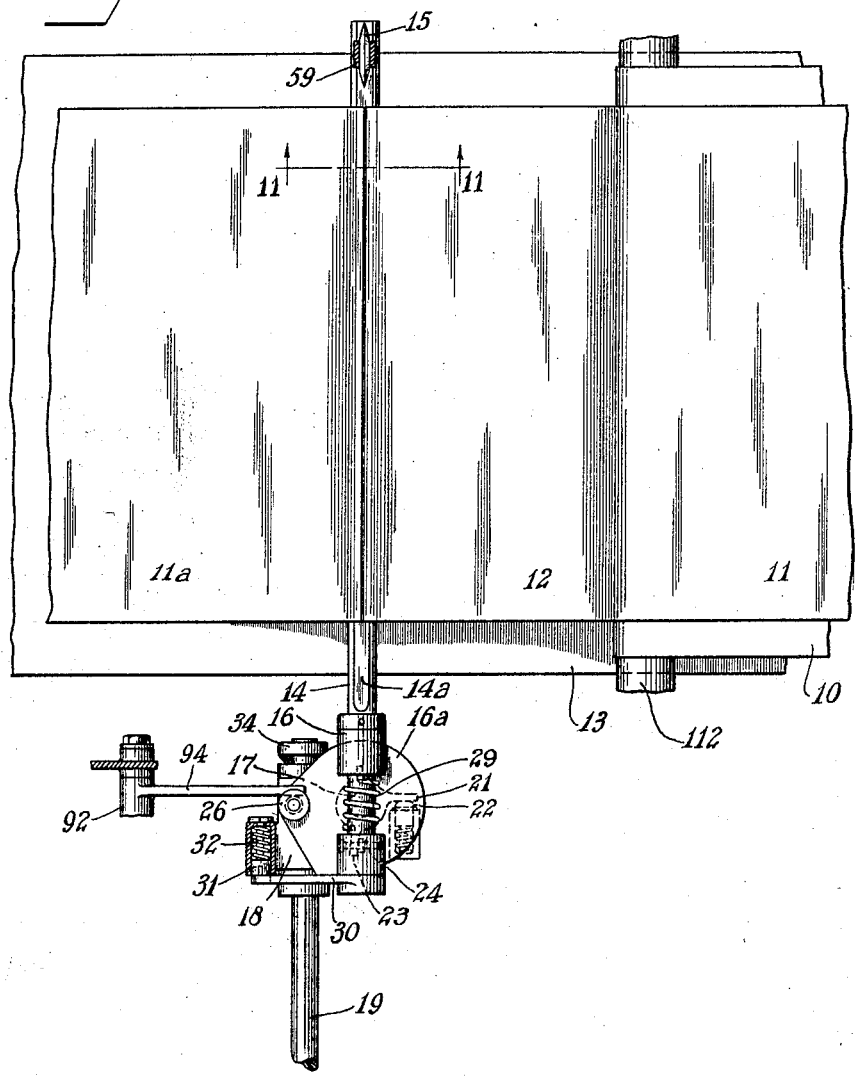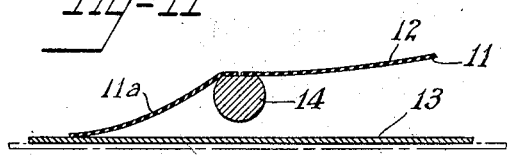

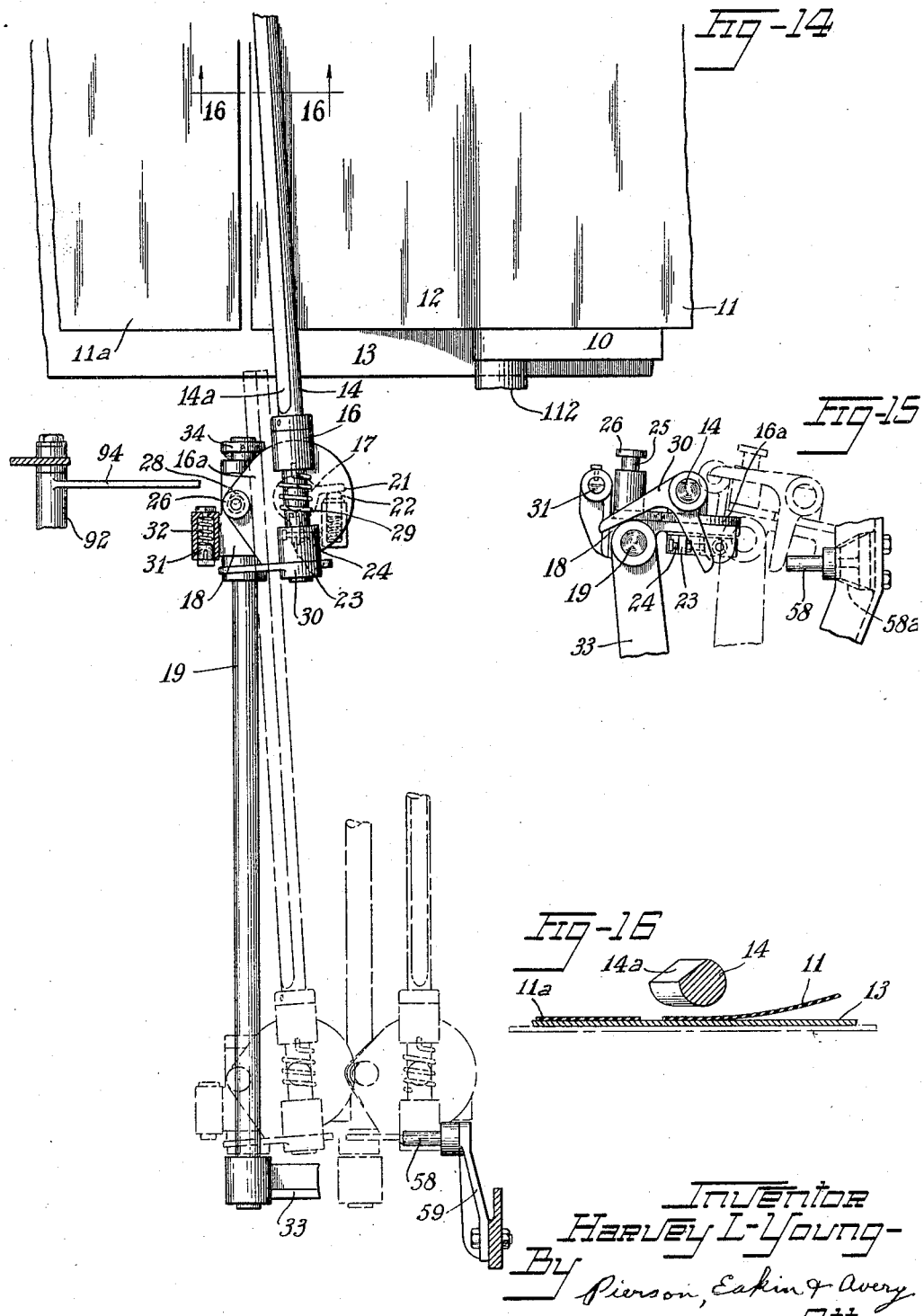

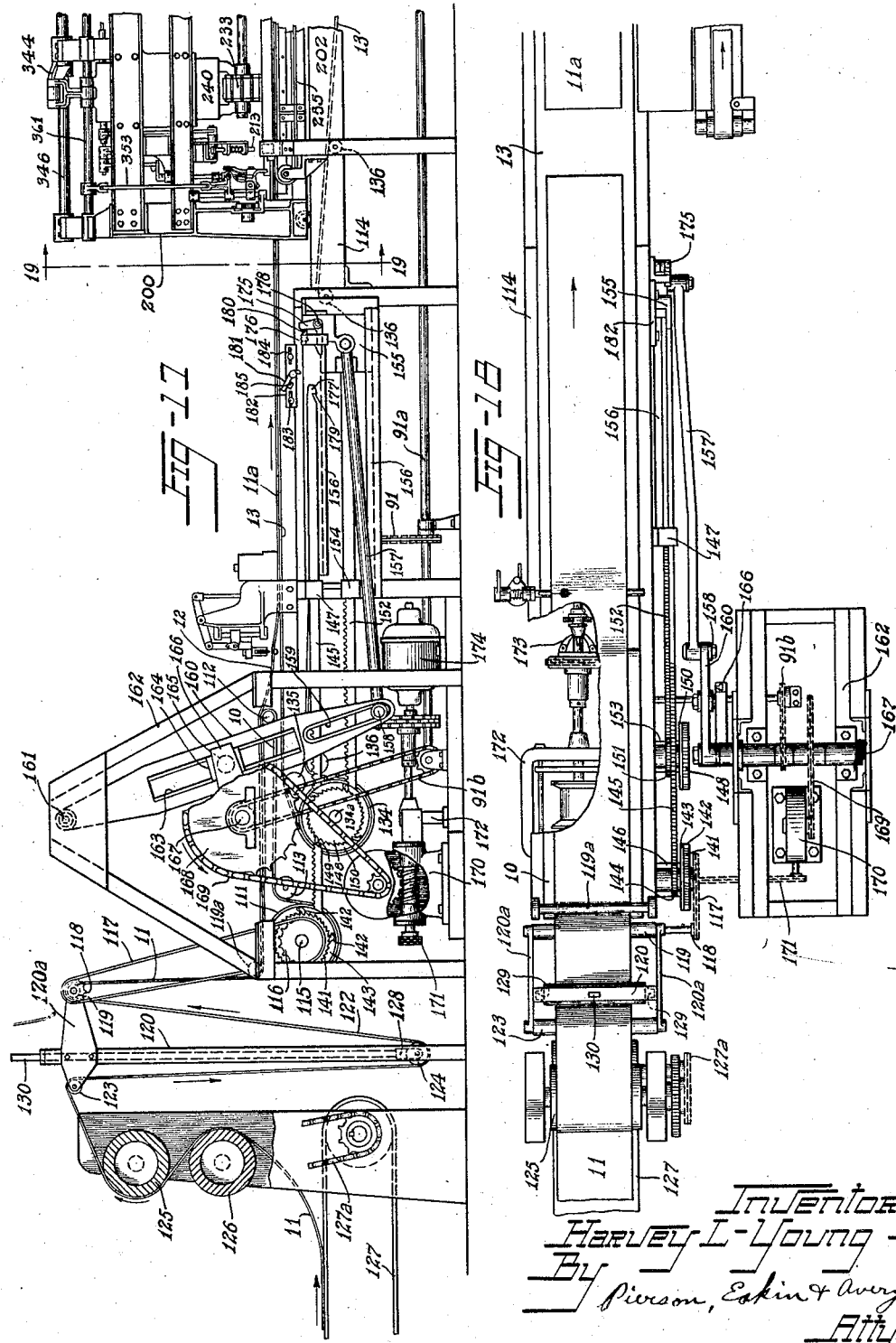

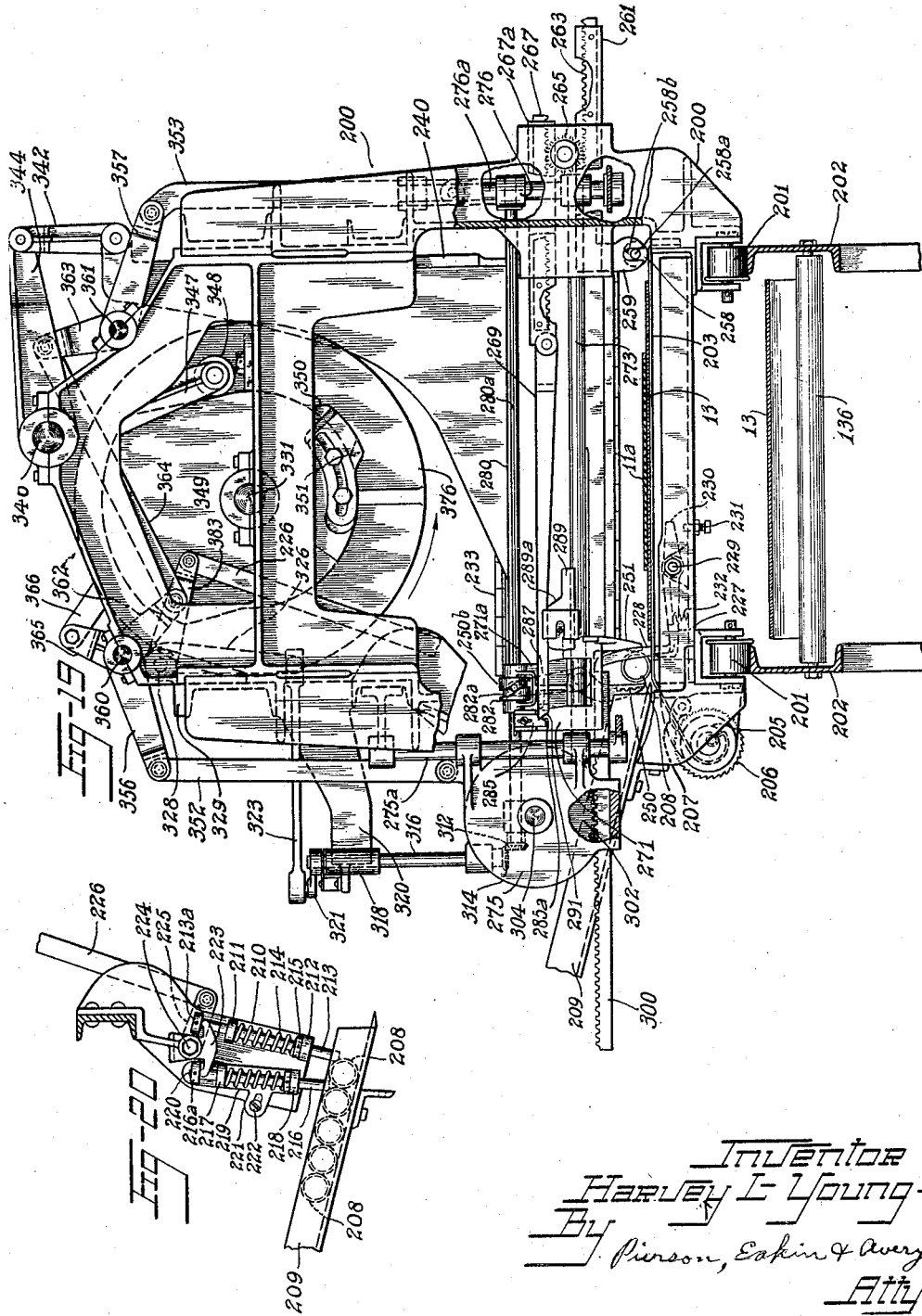

April 14, 1931. H. L. YOUNG 1,800,332
BLANK FORMING AND MANIPULATING APPARATUS
Filed Jan. 8, 1926 17 Sheets-Sheet 11
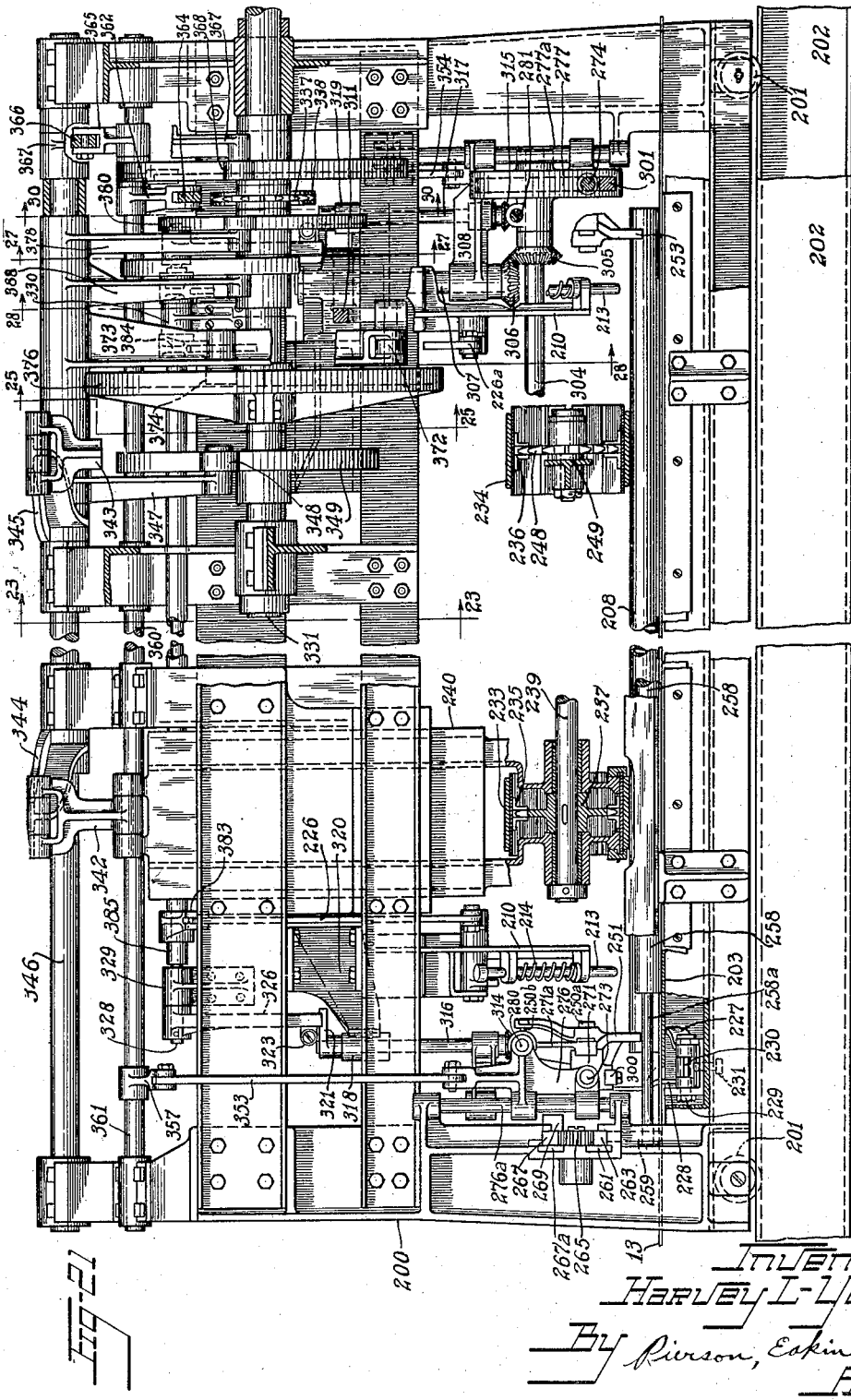
Inventor
Harvey L. Young
By Pierson, Eakin & Avery
Attys

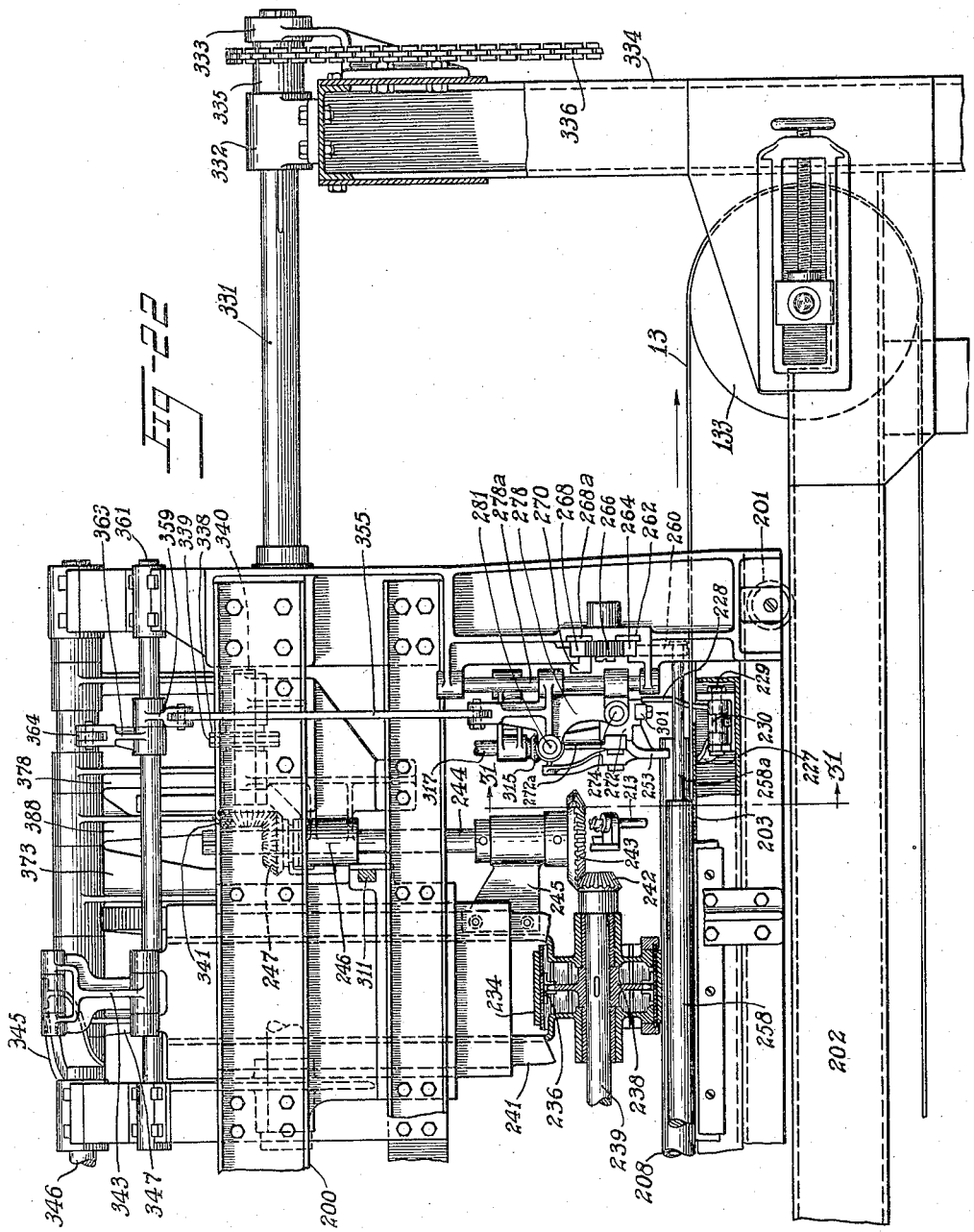

April 14, 1931. H. L. YOUNG 1,800,332
BLANK FORMING AND MANIPULATING APPARATUS
Filed Jan. 8, 1926 17 Sheets-Sheet 13
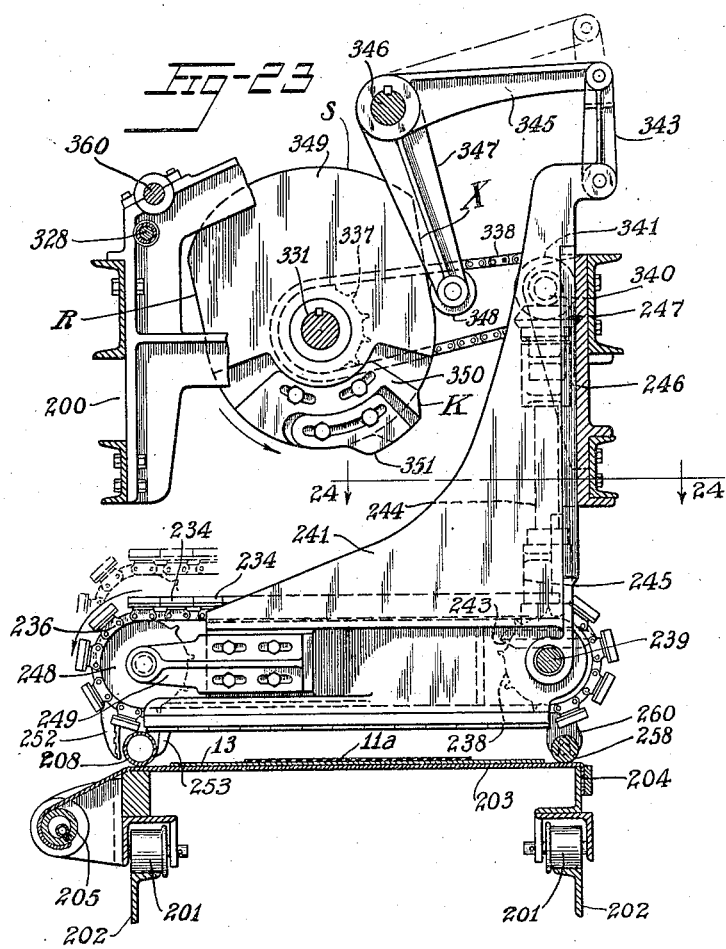
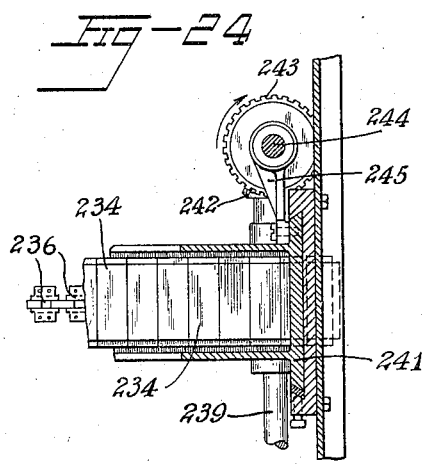
Inventor
Harvey L. Young
By Pierson, Eakin & Avery
Attys.

April 14, 1931.  H. L. YOUNG  1,800,332
BLANK FORMING AND MANIPULATING APPARATUS
Filed Jan. 8, 1926   17 Sheets-Sheet 14
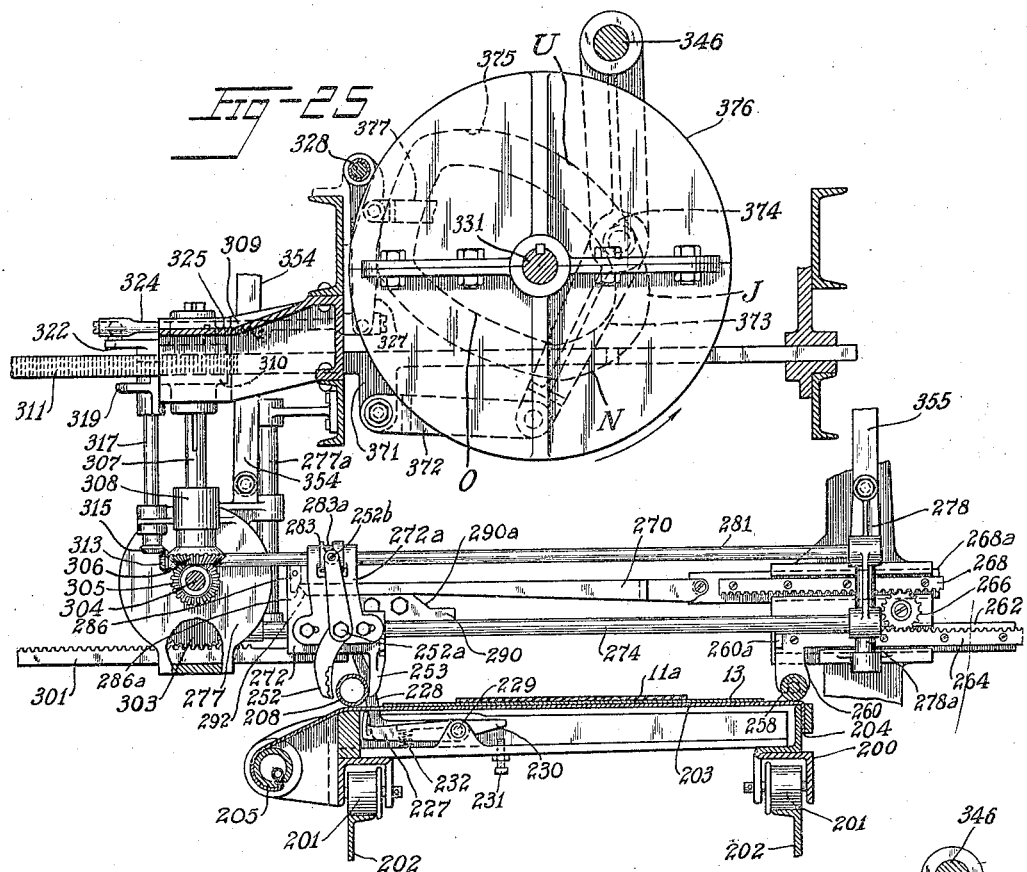
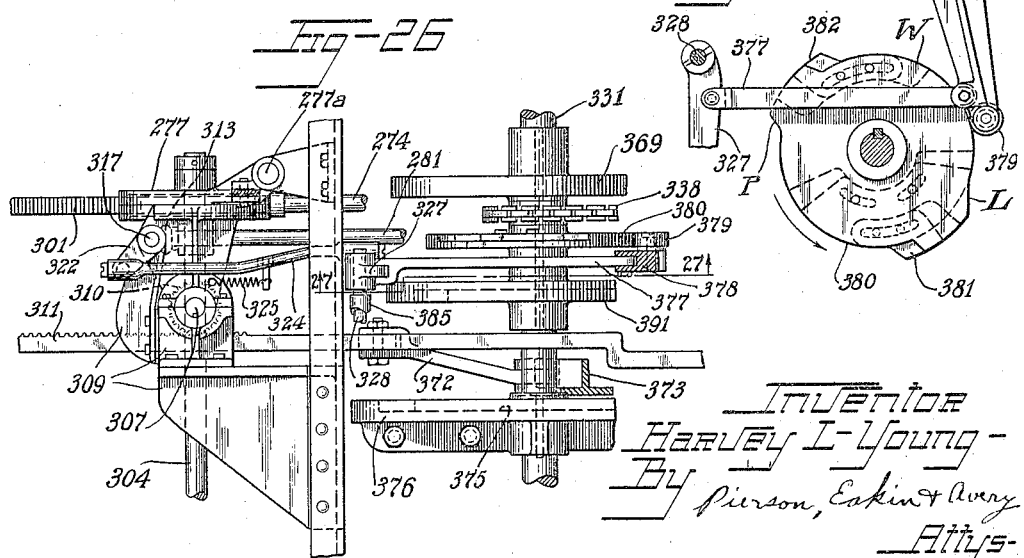
Inventor
Harvey L. Young
By Pierson, Eakin & Avery
Attys.

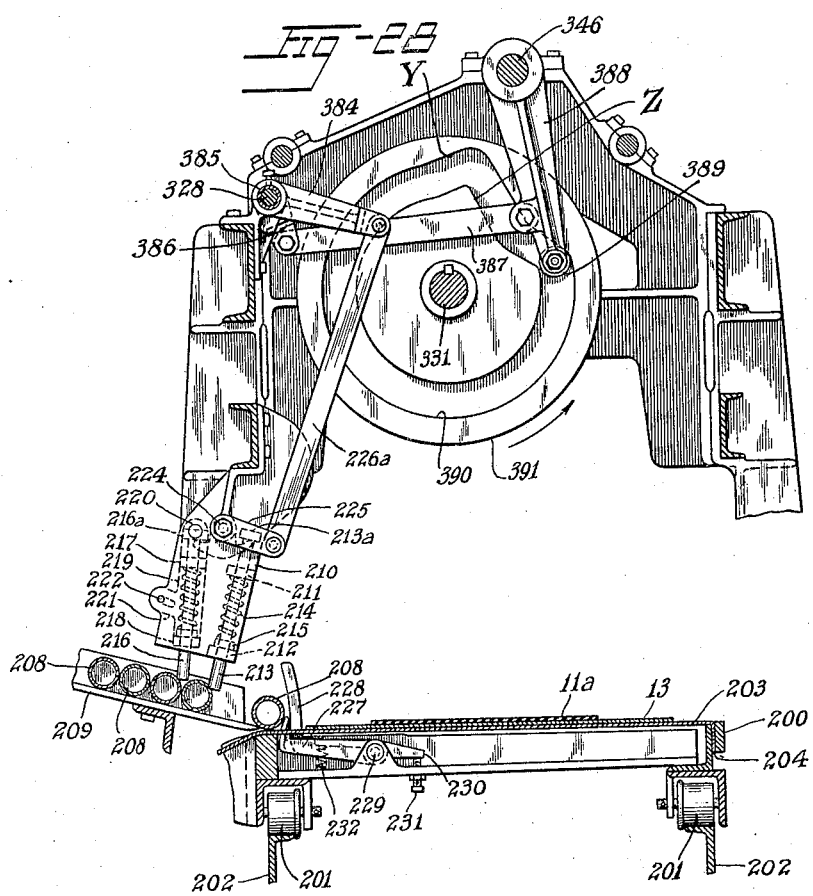
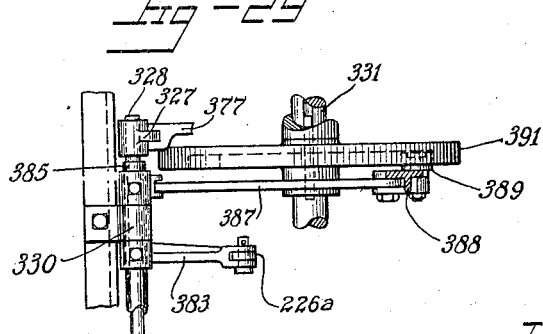

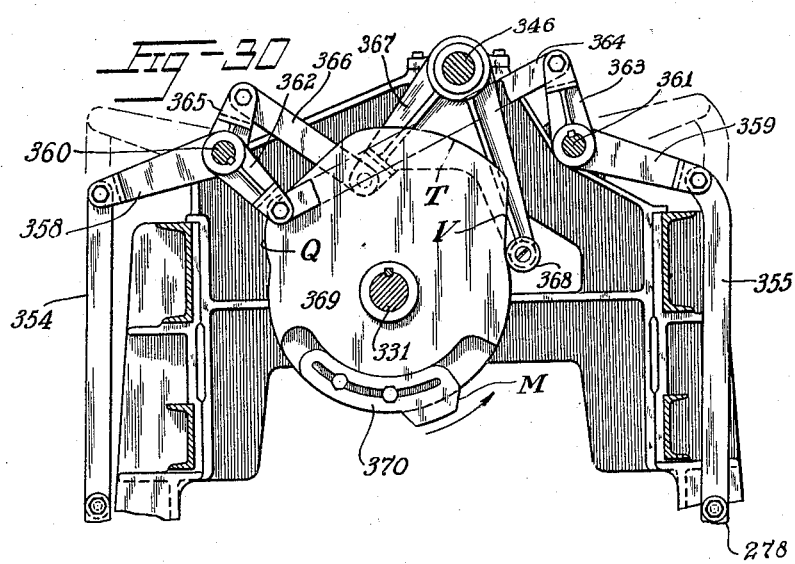
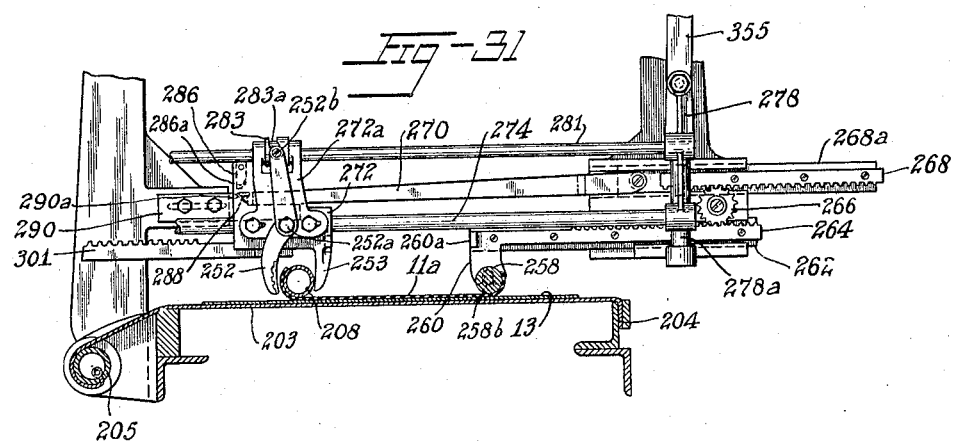
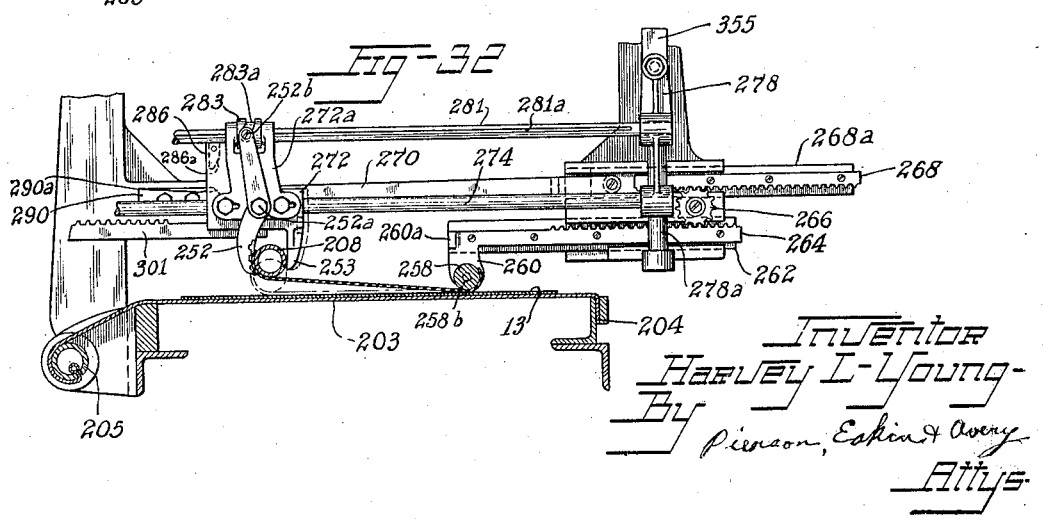

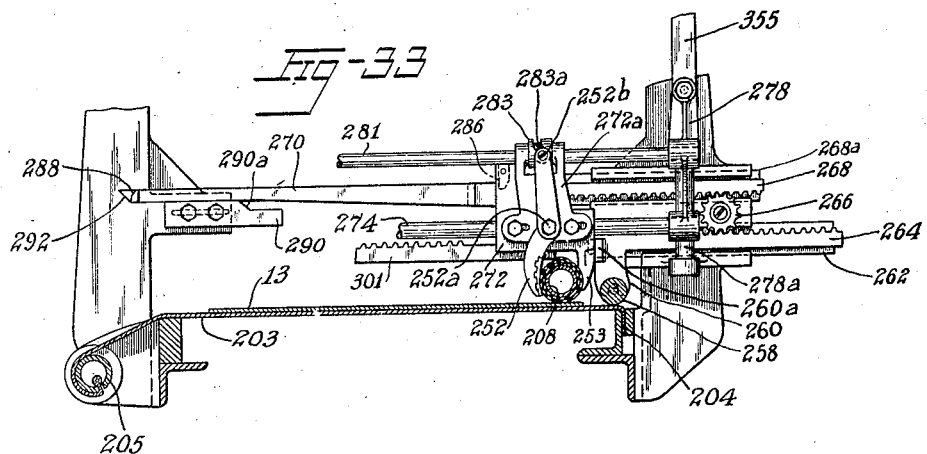
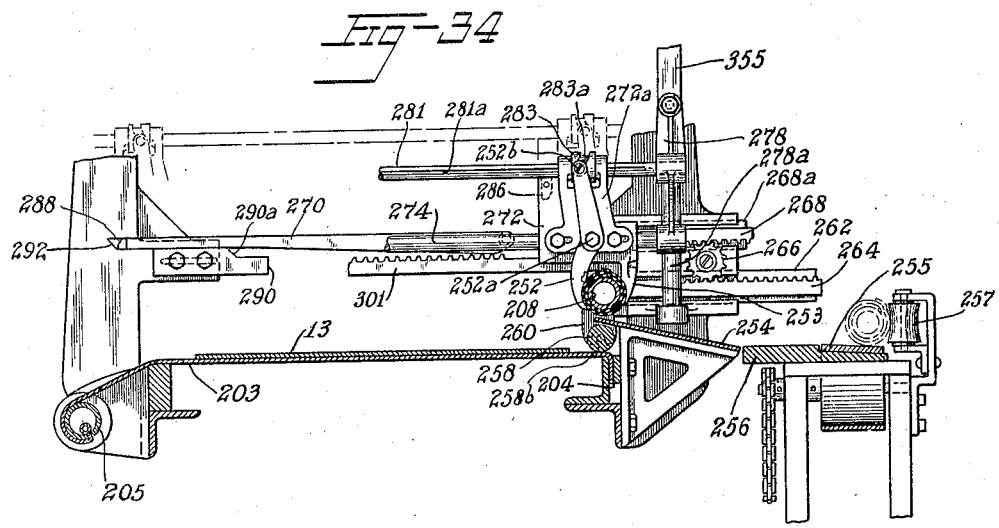
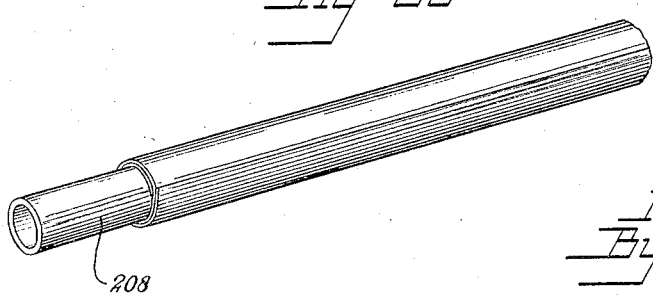

Patented Apr. 14, 1931

1,800,332

UNITED STATES PATENT OFFICE

HARVEY L. YOUNG, OF AKRON, OHIO, ASSIGNOR TO THE B. F. GOODRICH COMPANY, OF NEW YORK, N. Y., A CORPORATION OF NEW YORK

BLANK FORMING AND MANIPULATING APPARATUS

Application filed January 8, 1926. Serial No. 80,027.

This invention relates to the art of forming and manipulating blanks of sheet material, as in making inner tubes for pneumatic tires.

Such tubes have been made, prior to my invention, by intermittently feeding forward a continuous strip of calendered rubber, severing a length therefrom by hand between feeding movements, feeding the severed length or blank in such time relation as to step it ahead of the continuous stock strip from which it is severed, and rolling a mandrel transversely upon the severed blank by hand to wind the blank thereon. Such practice has required considerable care as well as labor in severing the successive blanks from the continuous strip at the proper position and at the proper time to provide uniform blanks, and also has required care in the mounting of the blank upon the mandrel, since the cutting of the strip at the proper position and the proper positioning of the blank upon the mandrel both have required visual control on the part of the operators.

One of my chief objects is to provide improved apparatus for severing blanks from the continuous strip of stock whereby uniformity of the blanks may be obtained without positioning of the severing means by the operator. A further object is to provide strip-feeding means, severing means and blank-conveying means so correlated that the blanks, uniformly cut by the severing means and uniformly carried forward by the conveying means will be uniformly supported at a determinate position for the rolling operation. Another object is to provide means for automatically rolling a mandrel upon a blank so positioned, and thereby to save labor and to provide accuracy and uniformity in the mounting of the successive blanks upon their mandrels. Further and more details objects will become manifest as the description proceeds.

I accomplish these objects, in the illustrative embodiment herein described, by providing, in combination with a pair of conveyor belts adapted to convey the continuous strip and the severed blanks respectively, and so timed as to step each blank ahead of the main strip as it is severed, automatic severing means and automatic tube-rolling means both timed with the conveyor belts.

In this embodiment the continuous-strip conveyor is adapted to feed the strip onto the blank-conveyor in such manner as to provide a suspended reach of the strip between the two and means is provided for severing the strip in the region of the suspended reach, the blank-conveyor being adapted to start its succeeding movement somewhat in advance of that of the continuous strip conveyor, so that first the severed blank is spaced apart from the leading end of the continuous strip and then the latter is fed forward at equal speed with the blank, the forward portion of the continuous strip having fallen onto the underlying part of the blank-conveyor, upon the cutting off of the blank, so as to be carried forward by the blank-conveyor in the next feeding movement of the continuous-strip conveyor.

The severing means comprises a cutter bar and means adapted to thrust it lengthwise under a high part of the suspended reach of the strip, then to move it forward to bring it into contact with the strip at the cutting position and to smooth the strip for the cutting operation, and then, after the blank is cut by a cutter acting against the bar, to tilt the bar on its own axis and also on an axis substantially normal to the plane of the strip, to disengage the bar from the severed stock, and then to withdraw the bar lengthwise to a position at the side of the strip for a repetition of the cycle.

The tube-rolling means comprises a pair of caterpillar-tread devices timed with the arrival of the blanks at rolling position and adapted to coact with the blank-conveyor to roll the successive mandrels upon the successive blanks, together with means for automatically presenting successive mandrels in tube-rolling position and means for lifting and drawing back each mandrel after the rolling operation is initiated to tension the unwound portion of the blank and for discharging the mandrel and blank assembly after the rolling operation. A hold-down member is provided for anchoring the far margin of the blank for the stretching operation and a stretched apron is provided under the adjacent reach of the blank-conveyor for flexibly supporting it against the force of the tube-rolling devices.

Of the accompanying drawings:

Fig. 1 is a side elevation of portions of the apparatus including the strip-severing mechanism, parts being sectioned and broken away for clearness of illustration.

Fig. 2 is a section on line 2—2 of Fig. 1.

Figs. 3 and 4 together constitute a section on line 3—3 of Fig. 1.

Figure 5:
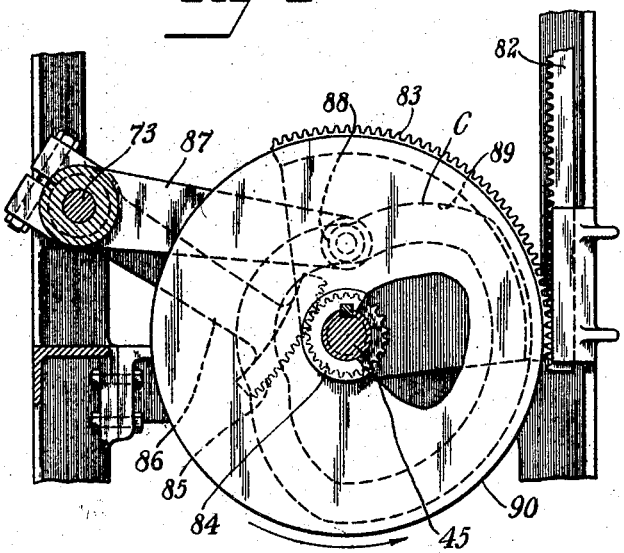

Fig. 5 is a section on line 5—5 of Fig. 1.

Figure 6:
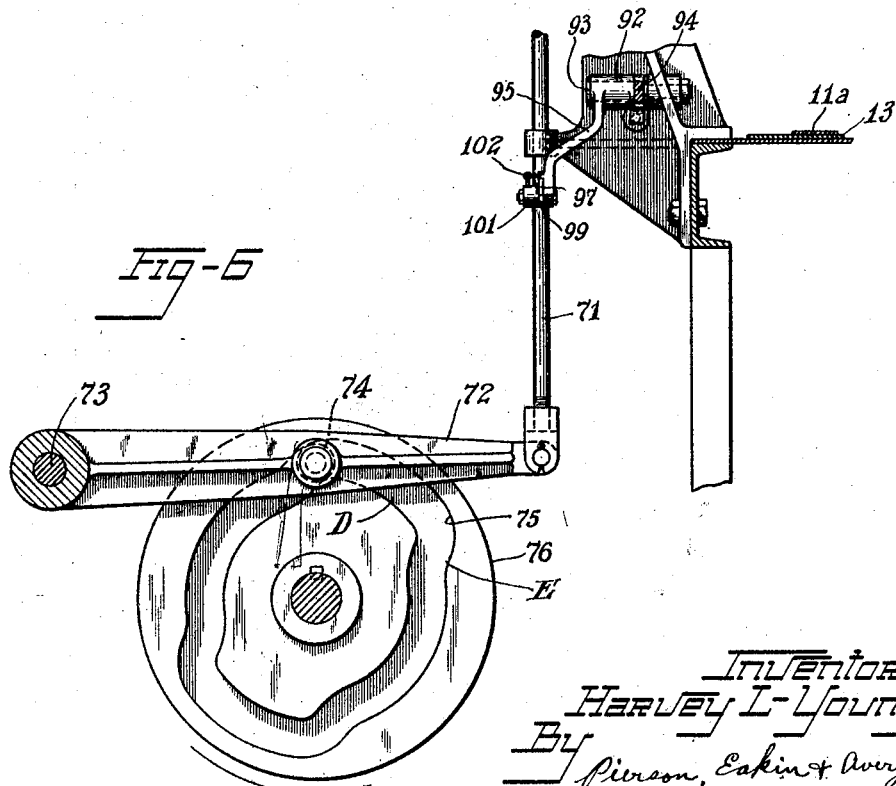

Fig. 6 is a section on line 6—6 of Fig. 1.

Fig. 7 is a plan view of parts of the apparatus in the vicinity of the severing device.

Fig. 8 is a section on line 8—8 of Fig. 7.

Fig. 9 is a fragmentary section on line 9—9 of Fig. 1.

Fig. 10 is a view similar to Fig. 7 but in which the cutter has completed its cutting movement.

Fig. 11 is a section on line 11—11 of Fig. 10.

Fig. 12 is a view similar to Fig. 10 but showing the position to which the cutter bar is moved after the cutting operation.

Fig. 13 is a section on line 13—13 of Fig. 12.

Fig. 14 is a view similar to Fig. 12 but showing a further movement of the cutter bar.

Fig. 15 is an elevation of parts of the apparatus, from the same viewpoint as that of Fig. 1, showing bar-actuating and bar-latching mechanism.

Fig. 16 is a section on line 16—16 of Fig. 14.

Fig. 17 is a side elevation of the conveyor-driving mechanism and adjacent parts of the apparatus.

Fig. 18 is a plan view of substantially the same parts of the apparatus with a portion thereof broken away.

Fig. 19 is a section on line 19—19 of Fig. 17, the tube-rolling device being shown in elevation with parts thereof broken away.

Fig. 20 is a fragmentary, transverse, vertical section showing parts of the mandrel-feeding mechanism in elevation.

Fig. 21 is a side elevation, parts being sectioned and broken away, of the tube-rolling device.

Fig. 22 is a side elevation of that general portion of the tube-rolling device which is shown as a section in Fig. 21, but with minor portions sectioned and broken away.

Fig. 23 is a section on line 23—23 of Fig. 21, parts appearing in elevation and being broken away.

Fig. 24 is a section on line 24—24 of Fig. 23.

Fig. 25 is a section on line 25—25 of Fig. 21.

Fig. 26 is a plan view of parts shown in Fig. 25.

Fig. 27 is a section on line 27—27 of Fig. 26 or Fig. 21.

Fig. 28 is a section on line 28—28 of Fig. 21.

Fig. 29 is a plan view of parts shown in Fig. 28.

Fig. 30 is a section on line 30—30 of Fig. 21.

Fig. 31 is a section on line 31—31 of Fig. 22, parts being omitted for clearness of illustration.

Fig. 32 is a similar section showing a later stage of operation.

Fig. 33 is a similar section showing a still later stage.

Fig. 34 is a similar section at a still later stage of operation showing the work-discharging devices.

Fig. 35 is a perspective view of one of the mandrels with a tube-blank wound thereon.

*Strip-feeding and severing devices*

Referring to the drawings, the apparatus comprises an endless belt conveyor 10 adapted to receive a continuous strip of sheeted inner-tube stock 11 from a suitable source such as a calender and to deliver it through a suspended reach 12 (Fig. 1) onto an endless belt conveyor 13 leading forward from a position below the delivery end of the conveyor 10. Suitable mechanism is provided for intermittently driving the two conveyors at equal speeds, but with the blank conveyor 13 starting each movement slightly before that of the conveyor 10 and then stopping simultaneously with the conveyor 10, so that each blank 11ª, 11ª, following its severance in the region of the suspended reach 12 between feeding movements, is so advanced as to be spaced apart from the remainder of the strip 11 before the latter begins to be fed forward.

The cutter bar, shown at 14, is formed with a flat face 14ª to be acted against by a rotary cutter 15. The cutting bar 14 projects from and is rotatably mounted at one end in a bracket 16 which has a broad base 16ª and a stem 17 (Fig. 7) by which it is pivoted, on a vertical axis, upon a slide 18, the latter being mounted upon a guide bar 19 and a guide rail 20 (see Fig. 4) for sliding movement in a direction transverse to the stock strip 11 such as to project the cutting bar 14 under and to retract it from the stock strip 11.

The stem 17 of the bracket 16 extends through the slide 18 and is provided below the slide with an arm 21 abutted by a spring plunger 22 mounted in the slide 18, for urging the cutter bar 14 about the axis 17, and with an arm 23 provided with an adjustable stop screw 24 adapted to abut the casing of the plunger 22 to limit the movement of the cutting bar about the said axis.

For latching the cutter bar in a position at right angles to the stock strip, a vertical latch bolt 25 having an enlarged head 26 is mounted in a part of the bracket 16 and is provided with a compression spring 27 (Fig. 1) adapted to urge it downwardly to cause its lower end to engage in a detent recess 28 formed in the upper face of the slide 18.

A torsion spring 29 is mounted upon the base portion of the cutting bar 14 and has its ends anchored in the said bar and in the bracket 16 respectively, said spring being adapted to urge the bar about its own axis from the position of Figs. 10 and 11 to the position of Figs. 12 and 13. To latch the bar against such rotation, in the cutting position of Figs. 10 and 11, against the force of the spring 29, a latching lever 30 of bell crank form is secured upon the adjacent end of the bar 14, one arm of said lever being adapted to latch upon a bolt 31 of cam latch form projecting from a part of the bracket 18 and backed by a spring 32 to permit cam latch action of the bolt 31 and the latching lever 30. The engaged arm of the latch lever 30 is adapted to slide from the end of the latch bolt 31 when the bracket 16 is rotated by the spring plunger 22 upon the lifting of the latch bolt 25, so as to permit the spring 29 to tilt the cutting bar 14 from the cutting position of Fig. 10 to the stripping position of Fig. 12, about its own axis, concurrently with the swinging of the bar about its vertical axis 17 by the force of the spring plunger 22.

For moving the cutting bar 14 forward under the stock strip, from the full line position of Fig. 7 to the broken line position of Fig. 7, the guide bar 19 and the guide rail 20 are secured at their ends to upstanding arms 33, 34, of a frame 38 which is pivoted at 35, 36, (Fig. 9) to a base casting 37, mechanism being provided for sliding the cutting bar and its mounting upon the guides 19, 20, to the left as viewed in Fig. 4, to retract the cutting bar from the stock strip, then to swing the frame 38 to the right as viewed in Fig. 1 to position the cutting bar for an advancing movement under a high part of the suspended reach 12 of the strip, then to move the slide 18, carrying the cutting bar, to the right as viewed in Fig. 4, to project the cutting bar under the strip, and then to tilt the frame 38 to the left as viewed in Fig. 1 to move the cutting bar forward under the strip from the full line position of Fig. 7 to the broken line position of Fig. 7.

The mechanism for tilting the frame 38 comprises an adjustable link 39 connecting said frame with a lever 40 (see Figs. 4 and 9), said lever being fulcrumed upon a vertical axis at 41 upon the frame of the apparatus and provided with a cam roller assembly 42 running in a cam groove 43 formed in a cam drum 44 secured upon a drive shaft 45.

For driving the cutting-bar slide 18 back and forth upon the guides 19, 20, said slide is connected by a link 46 with a lever 47 fulcrumed on a stub shaft 48 projecting from the tiltable frame 38 and formed near its hub with a co-axial, latterly projecting gear-segment 49 (Figs. 1, 4 and 9), the teeth of said gear segment being curved in their own radial planes, as shown clearly in Figs. 1 and 9, so that while tilting with the frame 38 upon which it is mounted, the lever 47 may be actuated by a gear segment 50 (Figs. 1 and 4) formed on one arm, 51, of a bell-crank lever 52 which is fulcrumed at 53 upon the stationary frame of the apparatus and has its other arm 54 provided with a cam roller 55 running in the groove 56 of a cam disk 57 secured upon the drive shaft 45.

For automatically setting the cutting bar in its latched condition of Figs. 1 and 9 against the force of the plunger 22 and spring 29, a stud 58 projects from a bracket 58ª mounted upon the stationary frame of the apparatus and is adapted to contact the lower arm of the bell-crank latching lever 30 in the movement of the frame 38 to the right of Fig. 1, with the slide 18 at its nearmost position, and thereby to turn the cutting bar 14 upon its own axis and to turn the bracket 16 about its axis 17, so that the lever 30 latches upon the bolt 31 and the latch bolt 25 drops into the recess 28 (Fig. 1) of the slide 18.

The rotary cutter 15 is journaled in the forked end of a yoke 59 which is backed by a spring 60 and slidably mounted in a bracket projecting from a slide 61 which is mounted upon a guide bar 62 and upon a guide rail 63, said guide bar and guide rail being connected at their ends by cross members 64, 65 slidably mounted upon respective vertical guide posts 66, 66, the latter being mounted in the stationary framing of the apparatus.

For lowering and raising the cutter 15 into and out of cutting position, the cross members 64, 65 are connected by respective links 67, 67 with arms 68, 68 projecting from a rock shaft 69 journaled in the top of the stationary framing of the apparatus, said rock shaft being provided at its one end with a rocker arm 70 (see Figs. 1 and 4), hinged at its outer end to a vertical slide bar 71. The latter is guided in brackets upon the stationary frame and is hinged at its lower end (see Figs. 1 and 6) to a lever 72 fulcrumed on a stationary shaft 73 and intermediately provided with a cam roller 74 running in a cam groove 75 formed in the side face of a cam disk 76 secured upon the drive shaft 45.

For running the slide 61 on the guides 62, 63 to cause the cutter 15 to sever the strip 11 and return to starting position, said slide has secured to and projecting therefrom (see Figs. 1 and 4), a rack 77 meshed with a pinion 78 which is journaled in a housing 79 carried by the cross member 64, the shaft of said pinion having flexible drive connection, through a universal joint assembly 80, Fig. 1, with a pinion 81 journaled upon a stationary part of the framing and meshed with a vertical rack 82 mounted to slide in the framing (Figs. 1, 5 and 9). Said rack 82 is meshed with a gear segment 83 secured to a pinion 84, the two being loosely journaled upon the drive shaft 45. The pinion 84 is meshed with a gear segment 85 formed upon the end of a lever arm 86 which is fulcrumed upon the stationary shaft 73, the said arm 86 being formed with a split hub which is clamped on a hub projection of a cam lever 87 which is loosely journaled upon the shaft 73 and is provided at its outer end with a cam roller 88 running in a cam groove 89 formed in the side face of a cam disk 90 secured upon the drive shaft 45.

The drive shaft 45 is adapted to be driven by a sprocket chain 91 running from a longitudinal shaft 91ª having driving connection, through a sprocket chain 91ᵇ (Figs. 17 and 18), with the conveyor-driving mechanism hereinafter described.

For lifting the latch bolt 25 of the cutter bar assembly to permit the plunger 22 and spring 29 to rotate and swing the cutter bar 14 to disengage it from the cut material at the end of each cutting operation, a bell crank lever 92 is fulcrumed at 93 (see Figs. 1, 4, 6 and 9) and has its upper, horizontal arm 94 projected into the path of the latching bolt 25 in such position as to cause its outer end to underlie the head 26 of said latching bolt when the cutter bar slide 18 is stopped in its position closest to the work. The lower vertical arm 95 of the bell crank lever is adapted to abut an adjustable stop 96 projecting from the framing, to support the horizontal arm 94 at a proper elevation to be received under the head 26 of the latching bolt, and the lower end of the vertical arm 95 is provided with an adjustable cam plate 97 having an oblique cam face 98 adapted to co-act with a dog 99 pivotally mounted upon the slide bar 71, to crowd the arm 95 to the right of Fig. 1 and thus lift the latching bolt 25 and so strip the latching mechanism of the cutter bar 14 at a time during the descending stroke of the slide bar 71 at which the said slide bar has lifted the cutter 15 clear of the work. The bell crank lever 92 is adapted to return by gravity against the stop 96 when the dog 99 has passed the cam plate 97. To permit the dog 99 to pass the cam plate 97 inoperatively during the ascending stroke of the slide bar 71, the dog 99, is pivoted at 100 upon a bracket 101 secured to said slide bar and is connected with the bracket by a pull spring 102 adapted to permit the dog to turn about said pivot during the up-stroke but to hold the dog stopped against a part of the bracket to prevent its rotation in the opposite direction during the down-stroke.

*Conveyor-driving means*

The carrier belt 10 is mounted at its receiving end upon a large diameter drive roll 111 (see Figs. 17 and 18) and at its delivery end upon a small diameter idler end-roll 112, and passes about an idler guide roll 113 adjacent the drive roll 111, for economy of space.

The said rolls are journaled in suitable framing 114 and the shaft, 115, of the drive roll 111, on which said roll is secured, also has secured thereon a sprocket 116 connected by a sprocket chain 117 with a sprocket 118 secured upon the shaft of a roll 119 which is journaled at an elevated position in brackets 120ª, 120ª secured upon an arch standard 120, the roll 119 being adapted to be intermittently driven, through the chain 117, to withdraw the continuous strip of sheeted rubber stock 11 from a storage loop 122 of said stock. Said storage loop is supported at its receiving side by an idler roll 123 journaled in the brackets 120ª, and is provided with a floating roll 124 for continuously drawing the strip into the storage loop, past cooling rolls 125, 126, from the delivery belt 127 of a calender (not shown). The belt 127 is adapted to drive the cooling rolls through gearing including a sprocket chain 127ª.

The floating roll 124 is journaled in the arms of a yoke 128, said arms slidably fitting in vertical guideways 129, 129 formed in the inner faces of the legs of the arch standard 120 as shown in Fig. 18, and the yoke is provided with a stem 130 slidably extending upward through a guide aperture formed in the top of the arch standard 120, the yoke and its stem thus having three point contact with the arch standard so that the floating roll is constrained to remain in a horizontal position and is prevented from cramping as it rises and falls with the shortening and the elongation of the storage loop.

A guide roll 119ª is mounted adjacent the receiving end of the carrier belt 10 and adapted to compel the stock strip to move vertically downward from the roll 119 and then pass horizontally onto the belt, so as to prevent variation in the line of feed of the strip, as an incident of varying tension in the strip imposed by inertia of the rising and falling of the floating roll 124, and so as to assure proper area of driving engagement between the belt and the strip.

The endless belt 13, for receiving the continuous strip 11 from the intermittent carrier belt 10 and for conveying the severed blanks 11ª, in spaced-apart relation, to the tube-rolling position, is mounted upon an idler delivery end-roll 133 (Fig. 22), a drive roll 134 (Fig. 17) and idler guide rolls 135, 136, 136, journaled in the framing 114.

For intermittently driving the carrier belt 10 a ratchet 141 is secured upon the shaft 115 of the drive roll 111 and is adapted to be driven by spring pawls 142, 142 on a pawl carrier 143 loosely journaled upon said shaft as a twin with a pinion 144 meshed with a rack bar 145 slidably mounted in guide brackets 146, 147 projecting from the framing 114.

For intermittently driving the carrier belt 13 a ratchet 148 is secured upon the shaft 134ª of the drive roll 134 and is adapted to be driven by spring pawls 149, 149 on a pawl carrier 150 loosely journaled on said shaft as a twin with a pinion 151 meshed with a rack bar 152 slidably mounted in guide brackets 153, 154 projecting from the framing 114. The forward end of said rack bar is secured to a slide or cross-head 155 mounted in guides 156, 156 secured to the framing, and for actuating said slide the same is provided with a connecting rod 157 having its other end pivoted on a crank-pin assembly 158 adjustably secured in a slot 159 formed in a lever 160 which has its upper end pivoted at 161 to the top of a drive-gear frame 162 mounted adjacent the framing 114. The middle portion of the lever 160 is formed with a longitudinal slot 163 in which is slidably mounted a crank-pin block 164 mounted upon a crank-pin assembly 165 which is adjustably secured to a crank-arm 166 secured upon the projecting end of a shaft 167 journaled in the drive-gear frame 162.

For driving the shaft 167 a sprocket 168 secured thereon is connected, through a sprocket chain 169, a worm-gear speed reduction device 170, a sprocket chain 171, a variable speed drive device 172, and a clutch 173, with a motor 174.

For actuating the rack-bar 145 to drive the carrier belt 10 intermittently in timed relation to the intermittent driving of the carrier belt 13 by the rack-bar 152, the forward end of the rack-bar 145 is adapted to be engaged and released by the slide 155 and a latch 175 mounted thereon, at a determinate position in the path of said slide, so that in each reciprocation of the slide the belt 10 will not begin to be driven until after the belt 13 has started and, since the drive ratios of the two belt-driving mechanisms are the same, will not be driven throughout so extensive a movement as that of the belt 13.

The slide 155 is formed with a tapered socket 176 to receive and center the end 177 of the rack bar 145, which is complementally tapered. The latch 175 is formed as a bell-crank-lever and is pivoted on the slide at 178, one arm extending toward the rack-bar 145 and being formed as a cam-latch to engage in a notch 179 formed in said rack-bar, and the other arm extending vertically, being urged toward latching position by a spring-backed plunger 180 mounted in the slide, and being adapted to be thrown to unlatching position, at a determinate position in the forward, idle stroke of the slide, by a weight pawl 181 mounted upon a plate 182 which is adjustably secured to the framing 114 by bolts 183, 183 mounted in slots 184, 184 in said plate. A stop 185 projecting from the plate 182 is adapted to engage the weighted arm of the pawl 181 to hold the pawl in latch-opening position.

Tube-rolling mechanism

The tube-rolling mechanism comprises a carriage 200 (Figs. 19, 21 and 22) provided with casters 201, 201 mounted upon rails 202, 202 constituting a part of the framing of the machine, the carriage thus being adapted to be accurately positioned with relation to the stopping position of tube blanks upon the carrier belt 13. A reach of the carrier belt 13 at the tube-rolling position slides upon and is supported by a rubberized-fabric apron 203 (Figs. 19 and 23) having one margin secured to the frame of the carriage 200 as at 204 (Fig. 23) and its other margin secured to a windlass roll 205 at the other side of the carriage, the windlass roll being provided with a ratchet 206 and pawl 207 (Fig. 19) and with a suitable crank, for keeping the apron sufficiently taut, the apron being thus supported only by engagement with its margins and being adapted to yield slightly by stretching when a mandrel 208 is rolled upon one of the tube blanks 11ª supported upon the overlying reach of the belt 13 to pick up the blank 11ª in the form of a tube upon the mandrel.

For delivering successive mandrels in position to be rolled onto the apron 203, the carrier belt 13, and the blank 11ª, a pair of angle irons 209, 209 are secured to the carriage 200 in inclined positions at one side thereof, the said pair of angle irons being adapted to serve as a chute for a series of the mandrels 208, their lower ends being positioned just over one side margin of the apron 203 (Figs. 19, 20 and 28).

For releasing one of the mandrels after another in timed succession to permit them to roll onto the apron 203 a pair of escapement devices are provided, one being adjacent each of the angle irons 209 and each comprising a depending bracket 210 secured to the frame of the carriage 200 and each formed with a pair of apertured guide lugs 211, 212, for a bar 213 urged downward toward a position in which its lower end portion will serve as a stop for the mandrels 208 by a compression spring 214 interposed between the upper guide lug 211 and a collar 215 secured to the bar and adapted to abut the lower lug 212 to limit the downward movement of the bar. To retain the remainder of the series of mandrels when the lowermost is released by the lifting of the bar 213, a similar bar 216 is slidably mounted in apertured guide lugs 217, 218 projecting from a plate 219 having its upper end pivoted at 220 to the bracket 210, the plate being backed by the bracket 210 and being provided with a slotted ear 221 in which is mounted a screw 222 threaded into the bracket, for securing the plate 219 in different positions of adjustment about its pivot 220, to space the lower end of the bar 216 at different distances from the bar 213 to adapt the escapement device for mandrels of different diameters. The bar 216 is provided with a compression spring and collar corresponding to those of the bar 213 for urging it toward its lowermost position.

The upper ends of the bars 213 and 216 are provided with respective heads 213ª and 216ª engaged on their under faces by respective arms of a T-shaped lever 223 secured to a rock shaft 224 mounted in the bracket 210 and provided with an actuating arm 225 pivoted to the lower end of a link 226 or 226ª, the arrangement being such that oscillation of the T-shaped lever 223 will cause the bars 213 and 216 to rise and descend in alternation so as to release the mandrels 208 one at a time from the chute.

For stopping each mandrel upon the apron 203 adjacent the exit of the chute a stop arm 227 is provided at each end of the apron 203, each stop arm having a common hub with a cam lever 228, the two being pivoted at 229 upon the framing of the machine below the carrier belt 13 and being formed integrally with a reversely extending arm 230 adapted to abut a stop screw 231 mounted in the machine framing, to limit the upward movement of the stop arm 227 and cam arm 228 under the force of a compression spring 232 (Figs. 19 and 25). The stop arm 227 and the cam 228 are spaced apart from each other so that the mandrel may pass between the two cam arms, while the two stop arms, being closer together, are within the path of the mandrel.

For rolling the mandrels over the apron 203, carrier belt 13 and blank 11ª, a pair of caterpillar tread devices are provided, each comprising an endless sprocket chain 235 or 236 mounted upon suitable sprockets and carrying the tread members 233 or 234 upon its links, the sprocket chains being arranged in parallel relation to each other in horizontal, transverse positions over the carrier belt 13 and being adapted to be raised and lowered with relation thereto. The drive sprockets of the respective belts are shown at 237 and 238 respectively, (Figs. 21 and 22) both being secured upon a common shaft 239 journaled in the lower ends of a pair of vertical slides 240, 241 mounted in the frame of the carriage 200, the shaft 239 being provided at one end with a beveled gear 242 (Fig. 22) meshed with a beveled gear 243 secured upon the lower end of a vertical shaft 244 which is journaled in a lower bracket 245 secured to the slide 241 and an upper bracket 246 secured to the frame of the carriage 200, said vertical shaft 244 being vertically slidable in the latter bracket and having splined thereto a beveled gear 247 swiveled upon the upper end of the bearing of the bracket 246, so that the sprocket chains 235, 236 may be driven while permitting vertical movement with the slides 240 and 241 upon which they are mounted.

The idler sprocket of the sprocket chain 236 is shown at 248 (Figs. 21 and 23), the said idler sprocket 248 and the idler sprocket of the chain 235 being similarly journaled upon respective stub shafts projecting from respective brackets such as that shown at 249 adjustably secured to horizontal extensions or feet formed on the respective slides 240 and 241.

For depressing the respective stop arms 227 and for lifting, drawing back and redepositing the mandrel 208 after it has rolled partly over the blank 11ª and wound a part of the latter onto itself, to smooth out and tension the unwound portion of the blank, a pair of devices including gripper jaws 250, 251 or 252, 253 are adapted to be lowered so that their jaws straddle the mandrel 208 in its position against the stops 227, at the same time engaging the cam levers 228 (see Figs. 19, 21 and 25) to depress the stops. The jaw-carrying devices are adapted then to be moved along with the mandrel as the latter is rolled over the apron by the caterpillar devices, with their jaws open, and, at a proper time in the progress of the mandrel, to cause the gripper jaws to close thereon and effect the desired movements thereof to stretch the blank and avoid wrinkles therein. Said devices are adapted then to release the mandrel and proceed onward therewith and, at the end of the mandrel's progress over the apron 203, to again grasp the mandrel, with the tube completely rolled thereon, and to lift it onto an inclined runway 254 mounted upon the frame of the carriage, so that the mandrel with the tube thereon will roll over the said runway and onto an endless carrier belt 255 which is adapted to transport the mandrel assembly lengthwise from the apparatus. The upper reach of the carrier belt 255 is adapted to slide upon an inclined runway formed in a stationary table 256, and a set of guide rolls such as that shown at 257 are journaled on vertical axes along the lower side of the carrier belt to prevent the mandrel assemblies from rolling therefrom while permitting them to be carried forward.

For holding the far margin of the blank 11ª while the gripper jaws lift, retract and redeposit the partly wound mandrel, a roll 258 is mounted upon a spindle 258ª journaled in vertical slots 258ᵇ formed in brackets 259, 260 which project downward from the ends of respective racks 263, 264 (Figs. 19, 21 and 25) which are secured to respective slide bars 261, 262 mounted in the frame of the carriage 200, each of the racks underlying and being meshed with a pinion, 265 or 266, loosely journaled upon the said frame. Each of the brackets 259 and 260 is formed with a lug such as the lug 260ª (Figs. 25 and 33) adapted to be abutted by one of the gripper jaws, as by the jaw 253, (Fig. 33) to drive the rack 263 or 264 away from the carrier belt to withdraw the roll 258 therefrom.

For driving the roll 258 in the other direction, onto the adjacent margin of the blank 11ª, to wind the latter partly upon itself and thus hold it against the pull of the jaws 250, 251, 252, 253, respective racks 267, 268 are meshed with the pinions 265, 266 at the upper parts of their orbits, the said racks being screwed to the faces of respective slide bars 267ª, 268ª and the said bars having pivoted to their inner ends respective actuating bars 269, 270.

The jaws 251 and 253 are formed upon respective slides 271, 272 each mounted upon a guide bar 273 or 274 having its ends secured in a pair of vertically moving slides, 275 and 276 or 277 and 278, said slides being mounted upon respective guide bars 275ª and 276ª or 277ª and 278ª secured to the carriage frame.

The horizontally moving, jaw-carrying slide 271 or 272 has adjustably secured thereto a forked bracket 271ª or 272ª, its forks being apertured and slidably mounted upon a shaft 280 or 281 journaled at its ends in the vertically movable slides 275 and 276 or 277 and 278.

The movable gripper jaw of each pair, 250 or 252, is pivoted on the adjustable bracket at 250ª or 252ª and is formed with an actuating arm extending upward from its pivot and provided at its upper end with a cam stud 250ᵇ or 252ᵇ mounted in a cam groove 282ª or 283ª formed in the periphery of a cam 282 or 283 provided within its bore with a suitable stud extending into a spline groove 280ª or 281ª in the shaft 280 or 281, means being provided for suitably rotating the shaft to open and close the jaws through the action of the cam.

Adjustably secured upon each of the slides 271 or 272 is a dog 285 or 286 having an inclined face 285ª or 286ª adapted to engage a complementally inclined offset face 287 or 288 formed on the end portion of the actuating bar 269 or 270 as the slide 271 or 272 moves toward the delivery side of the carrier belt 13, the dog thus being adapted to move the holder roll 258 onto the work, the pivoted actuating bar 269 or 270 being slidably supported by a cam 289 or 290 adjustably secured to a stationary part of the frame and formed with an inclined face 289ª or 290ª adapted to coact with a complementally inclined face 291 or 292 formed on the end of the actuating bar to permit the bar to fall out of engagement with the dog 285 or 286 at a determinate position, as shown in Fig. 31, to terminate the movement of the actuating bar, and, upon reverse movement of the actuating bar, to lift the bar in position to be again projected over the cam for engagement by the dog in the next stroke, as shown in Fig. 33.

For running the slide 271 or 272 back and forth across the apron 203 a rack 300 or 301 is secured to the slide and meshed with a gear 302 or 303 inclosed by a housing constituting a part of the vertically movable slide 275 or 277 and formed with a guide portion for holding the rack in mesh with the gear, both of the said gears being secured upon a shaft 304 journaled in the said housings and having secured thereon a bevel pinion 305 (Figs. 21 and 25) meshed with a bevel pinion 306 secured upon the lower end of a vertical shaft 307 journaled in a bracket 308 projecting from the slide 277, the upper end portion of said shaft 307 being slidably mounted in a bracket 309 extending from the frame of the carriage 200, said bracket being recessed to accommodate a pinion 310 splined upon the shaft 307 and meshed with a rack 311 guided in the framing of the carriage 200.

For rotating the shafts 280 and 281 each is provided with a bevel gear 312 or 313 upon one end thereof, said gears being meshed with respective bevel gears 314, 315 secured upon the lower ends of vertical shafts 316, 317 journaled in the slide 275 or 277 and slidably extending through a bearing 318 or 319, the bearing 318 being formed upon a bracket 320 (Figs. 19 and 21) projecting from the carriage and the bearing 319 (Fig. 25) being formed upon the bracket 309 above described.

Secured upon the upper ends of the shafts 316, 317 are respective cranks 321, 322 (Figs. 19 and 25) having ball and socket connection with respective links 323, 324 which are urged toward jaw-opening position, having reference to the jaws 250, 251 or 252, 253, by a pull spring 325 (Figs. 25 and 26) connecting the link 324 with the bracket 309, the links 323 and 324 having ball and socket connection with respective arms 326, 327 secured to a common shaft 328 journaled in brackets 329, 330 (Fig. 21) secured to the carriage frame.

The driving mechanism for the several above described parts of the tube-rolling apparatus comprises a main drive shaft 331 journaled in the frame of the carriage 200 and slidably extending through bearings 332, 333 (Fig. 22) mounted upon a standard 334 at the end of the apparatus, the said shaft 331 being splined in a sprocket 335 mounted between the bearings 332, 333 and provided with a drive chain 336 running from the shaft 91ª above described, thus being positively connected with the driving gear of the strip feeding and cutting mechanisms above described.

For continuously driving the mandrel-rolling, caterpillar-tread devices 233, 234, a sprocket 337 (Figs. 21 and 23) is secured upon the shaft 331 and connected by a sprocket chain 338 with a sprocket 339 secured upon a common shaft 340 with a bevel gear 341 (Figs. 22 and 23) which is meshed with the bevel gear 247 through which the shaft 244 above described is splined.

For raising and lowering the slides 240 and 241 with the caterpillar devices thereon, the upper ends of the slides are connected by respective links 342, 343 with arms 344, 345 projecting from the shaft 346 journaled in the top of the carriage frame and provided with an arm 347 having at its end a cam roller 348 running upon the periphery of a cam disk 349 which is secured upon the shaft 331 and is provided with adjustable segmental cam plates 350, 351 for determining the time at which the caterpillar devices are raised to permit the lifting and backward, blank-tightening movement of the mandrel, and the time during which they shall remain in the lifted position.

For raising and lowering the slides 275, 276, 277, 278 and the parts carried thereby, the said slides are connected by links 352, 353, 354, 355 with respective arms 356, 357, 358, 359, (Figs. 19 and 30) the arms 356 and 358 extending from a rock shaft 360 journaled in the carriage frame and the arms 357 and 359 projecting from a rock shaft 361 so journaled.

For driving the rock shaft 361 from the rock shaft 360 to compel the four jaw-carrying slides to rise and descend together, a downwardly projecting arm 362 on the shaft 360 and an upwardly projecting arm 363 on the shaft 361 are connected by a link 364.

For rocking the shaft 360 the said shaft is provided with an arm 365 (Fig. 30) connected by a link 366 with a bell-crank lever 367 fulcrumed upon the shaft 346 and provided with a cam roller 368 running upon the periphery of a cam disk 369 secured upon the main drive shaft 331 and provided with an adjustable, segmental cam plate 370 adapted to vary the time at which the jaw-carrying slides will be lifted for the blank-stretching movement of the jaws.

For running the jaw-carrying slides back and forth across the apron, the rack 311 (Figs. 21 and 25) is formed with an ear 371 (Fig. 25) connected by a link 372 with the outer end of a cam lever 373 which is fulcrumed at its upper end of the shaft 346 and provided at an intermediate part with a laterally projecting cam roller 374 mounted in a cam groove 375 formed in a cam disk 376 secured upon the main drive shaft 331.

For turning the shafts 280 and 281 to close the mandrel gripping jaws, in opposition to the force of the spring 325, the arm 327 secured upon the rock shaft 328 is connected by a link 377 with a cam lever 378 (Figs. 21 and 25 to 27) fulcrumed upon the shaft 346 and provided at its end with a cam-roller 379 running upon a cam disk 380 which is provided with adjustable segmental cam plates 381, 382 for varying the length of time during which the jaws will be held closed.

The actuating links 226 and 226ª of the mandrel escapement devices have their upper ends pivoted to respective arms 383, 384 (Figs. 19, 21 and 28) secured to a hollow shaft 385 surrounding the shaft 328, said hollow shaft being provided with a rocker arm 386 connected by a link 387 with a cam lever 388 fulcrumed upon the shaft 346 and provided at its outer end with a laterally projecting cam roller 389 mounted in a cam groove 390 formed in the side face of a cam disk 391 secured upon the main drive shaft 331.

Operation

In the operation of the apparatus the stock strip 11 is led about the rolls 126, 125, 123, 124, 119, and 119ª and onto the carrier belt 10, as shown clearly in Fig. 17. The motor 174, through the intermediate gearing described, continuously drives the shaft 167 and crank-arm 166, and the crank-pin block 164, sliding in the slot 163 of the lever 160 as the crank-arm revolves, imparts a continuously reciprocating motion to the slide 155 and the rack-bar 152 attached thereto, the carrier-belt 13 thereby being caused to be driven during the leftward stroke of the slide as viewed in the drawings, and being permitted to remain still, the pawls 149 running free on the ratchet 148, during the return or rightward stroke of the slide.

Shortly after the carrier belt 13 starts each such movement, the slide 155 and latch 175 engage the rack-bar 145 and thus the slide drives the carrier belt 10 during the rest of its leftward stroke. In the return or rightward stroke of the slide, during which the carrier belt 10 stands still, the latch 175 returns the rack-bar 145 to its original position, where it is released by the action of the pawl 181 upon said latch.

In the first feeding movements of the two belts, which move at equal speeds, the stock strip is fed from belt 10 onto belt 13 and its leading end portion is carried forward by the latter. When the two belts stop, simultaneously, upon the beginning of the slide's return or idle stroke, the severing device above described severs the strip at a determinate position in the suspended reach 12 between the two conveyor belts. In the succeeding feeding movement of the belts, the belt 13 starting before the belt 10 starts, the severed blank 11ª is stepped a determinate distance ahead of the main body of the strip, the end portion of the latter dragging upon the belt 13 until the belt 10 starts, and then being fed onto the belt 13 and carried forward thereby with its leading end determinately positioned thereon in spaced apart relation to the preceding blank, the cutter bar 14 and the cutter 15 being actuated to sever the strip and then withdrawn from the line of feed by their actuating-mechanisms above described.

Continuous operations of the apparatus as described provides successive blanks determinately positioned upon the belt 13.

In the operation of the cutter the frame 38 (see Figs. 1, 4 and 9) is oscillated through two cycles and the cutter 15 is run through two cycles at each revolution of the shaft 45, as will be apparent upon reference to the cam grooves 43 and 56 in Figs. 1 and 4. Starting with the parts in the positions of Figs. 1, 4 and 9 the frame 38 is held in cutting position by the reach A (Fig. 9) of the cam groove 43 while the reach B (Fig. 4) of the cam groove 56 through the levers 54, 51 and 47, holds the cutter bar 14 projected under the work and the incline C (Fig. 5) of the cam groove 89, through the lever arms 87, 86 and gear segment 85, pinion 84 and gear segment 83 lowers the rack 82 and thereby drives the gear 78 to run the cutter 15 outward upon the bar 14 and thereby sever the blank, the cutter being in its lowered position by reason of the slide-bar 71 being held elevated by the reach D (Fig. 6) of the cam groove 75, this occurring during the idle return stroke of the racks 145, 152 of the conveyor driving mechanism (Fig. 17).

The decline E of the cam slot 75 (Fig. 6) then raises the cutter by lowering the slide-bar 71 and during the latters' descent the dog 99 (Fig. 1) actuates the bell-crank lever 92 to trip the latch bolt 25 and permit the plunger 22 to turn the cutter bar 14 on its bracket 16 about the axis 17, such rotation of the bracket 16 causing the latch lever 30 to slip from the latch bolt 31 so that the spring 29 (Fig. 4) turns the bar on its own axis, the bar thus being moved from the position of Fig. 10 to that of Fig. 12.

The frame 38 is then swung a little to the right as viewed in Fig. 1 by an oblique reach similar to and opposite the reach F (Fig. 1) of the cam groove 43 to move the bar away from the severed blank, to the full line position of Fig. 14, and the frame 38 is thus held by a reach corresponding to the reach G of said cam groove while the decline H (Fig. 4) of the cam groove 56 withdraws the cutter bar 14 to the side of the work, as shown by dotted lines in Fig. 14.

With the cutter bar thus withdrawn the frame 38 is swung further to the right and then held, by the action of the cam 44 while the incline I (Fig. 4) of the cam 57 again projects the bar under the work, the swinging of the frame causing the lever 30 to contact the pin 58 (Fig. 15) to restore the bar to the position in which it is latched by the bolts 25 and 31, before such projection of the bar under the work.

The frame 38 is then swung in the opposite direction by the cam 44, to move the cutter bar forward lengthwise of the work to cutting position, the cutter meanwhile being raised and returned to its starting position, and then lowered again onto the cutter bar by the action of the cams 76 and 90, and the work meanwhile being fed forward the proper distance for the next cutting operation.

Thus successive blanks 11ª are provided in spaced apart relation upon the carrier belt 13, and are successively stopped, while supported thereon, at the tube-rolling position, over the apron 203, Fig. 19.

In the operation of the tube-rolling apparatus, the carriage 200 being properly placed over the stopping position of the successive blanks upon the carrier belt 13 and the drive shaft 331 being continuously driven, the caterpillar tube-rolling devices 233 and 234 are continuously driven through the sprocket chain 338 (Fig. 23) and are raised and lowered at proper time by the action of the cam disk 349, the other instrumentalities being intermittently actuated by their respective driving mechanisms.

Starting with the parts in the position shown in Fig. 19, a mandrel 208 having been discharged from the chute 209 so that it lies upon the margin of the apron 203, and the jaw-carrying slides 271 and 272 having been lowered so that their jaws straddle the mandrel and the stop arms 227 being depressed by contact of the slides with the cam levers 228, the said slides are moved forward over the apron, their jaws straddling the mandrel without gripping it, by the cam 376, acting through the lever 373, rack 311, pinion 310 (Fig. 25), shaft 307 and shaft 304, while the cam roller 374 traverses the incline J (Fig. 25) of the cam groove 375, the mandrel being rolled forward at the same speed by the caterpillar tread devices 233 and 234.

When the mandrel, starting to wind the blank 11ª upon itself, has reached the position shown in Fig. 31, the caterpillar tread devices are lifted by the incline K (Fig. 23) of the cam disk 349 and the jaws are closed by the incline L (Fig. 27) of the cam disk 380, acting through the lever 378, link 377, shaft 328, arms 327, 326, links 324, 323 and shafts 317, 316, while the jaw-actuating frames comprising the vertically movable slides 275, 276 and 277, 278 are lifted by the incline M (Fig. 30) of the cam disk 369, acting through the lever 367, link 366, shafts 360 and 361 and links 352, 353, 354, 355, and the jaw-carrying slides 271, 272 are moved backwardly, to tension the blank, by the decline N (Fig. 25) of the cam disk 376, the jaws with the mandrel therein being then lowered again onto the carrier belt 13 as the roller 368 (Fig. 30) passes from the cam plate 370, and being then opened by the roller 379 (Fig. 27) passing from the cam plate 381 of the cam disk 380, permitting the spring 325 (Fig. 26) to contract.

The backward movement of the mandrel is illustrated in Figs. 31 and 32, where it will be seen that just before the mandrel is lifted and retracted the hold-down roll 258 is advanced onto the far margin of the blank 11ª by the action of the dogs 285, 286, bars 269, 270 and racks 267, 263 and 268, 264, the hold-down roll 258 being stopped with the blank partly wound thereon when the actuating bars 269, 270 are permitted, by the cam faces 289ª, 290ª of the cam plates 289, 290, to drop out of engagement with the respective dogs 285, 286.

When the mandrel has been thus re-deposited upon the carrier belt, the cam roller 348 (Figs. 19 and 23) passes from the cam plate 351 on the cam disk 349 and thus permits the caterpillar devices to descend again upon the mandrel, while being continuously driven, and to impel the mandrel on across the carrier belt, the mandrel gripping jaws, now re-opened, being moved along with the mandrel by the incline O (Fig. 25) of the cam groove 375 in the cam disk 376.

In this movement of the mandrel-gripping jaws, the leading jaws 251 and 253 engage the lugs such as the lug 260ª (Fig. 33) upon the respective racks 263, 264 and drive the hold-down roll 258 back to its starting position and, through the action of the pinions 265 and 266, return the actuating bars 269, 270 to their starting positions, ready to be engaged again by the dogs 285, 286 upon the next stroke.

When the work has been rolled to the position of Fig. 33, the jaws are closed thereon by the action of the incline P (Fig. 27) of the cam disk 380 and are lifted by the action of the incline Q (Fig. 30) of the cam disk 369, while their continued forward movement brings them into the position of Fig. 34, where they are opened by the cam roller 379 (Fig. 27) passing from the cam plate 382, to drop the work onto the inclined runway 254, to pass by gravity onto the carrier-belt 255 and be propelled from the apparatus thereby.

Just before the work is lifted onto the runway 254 as described, the caterpillar devices 233 and 234 are lifted by the incline R (Fig. 23) of the cam disk 349 and are then held elevated by the reach S of the said cam disk while the jaw-carrying slides, their framework being held elevated by the reach T (Fig. 30) of the cam disk 369, are returned, to the side of the device from which they started, by the decline U (Fig. 25) of the cam groove 375 in the cam disk 376, the decline V (Fig. 30) of the cam disk 369 then lowering them onto the next mandrel, the jaws being held in open position while the roller 379 is upon the reach W (Fig. 27) of the disk 380. The decline X (Fig. 23) of the disk 349 again lowers the caterpillar device onto the next mandrel to roll it onto the next blank, the carrier belt 13 having been advanced during the return movements of the jaw-carrying devices to bring the next blank into rolling position.

During such return movement of the jaws also the cam roller 389 (Fig. 28) traverses the incline Y and the decline Z of the cam groove 390 in the disk 391 and acts, through the lever 388, link 387, hollow shaft 385 and links 226 and 226ª, to release one of the mandrels 208 to permit it to roll from the chute 209 onto the apron 203 where it is stopped by the arm 227, the latter having been permitted to rise into stopping position by the passage of the jaw-carrying slides 271, 272 from the cam arms 228, 228 in the preceding forward movement of the said slides.

The apparatus as described is entirely automatic from the calendering of the stock to the delivery of the mandrels with the tubes wound thereon, with the exception of the permissible manual application of a valve stem reinforcement patch and paper labels to successive blanks at a station intermediate the severing means and the rolling apparatus, and the advantages set forth in the above statement of objects are thus provided.

My invention is susceptible of various modifications within the scope of the appended claims.

I claim:

1. Apparatus of the character described comprising means for longitudinally feeding a continuous strip of stock, means timed with said feeding means for severing blanks from said strip, and means timed with the feeding means and the severing means for mounting the blanks upon mandrels.

2. Apparatus of the character described comprising means for longitudinally feeding a continuous strip of tacky rubber stock, means timed therewith for severing successive blanks from said strip, and feeding means for the blanks adapted to space each blank apart from the succeeding blank and formed to support the blank in straight, fully spread condition upon its surface.

3. Apparatus of the character described comprising means for longitudinally feeding a continuous strip of stock, means timed therewith for severing successive blanks from said strip, and feeding means for the blank adapted to step it longitudinally forward ahead of the strip from which it is severed, said severing means being positioned operatively between the two said feeding means and being mounted for movement into the path of the strip between the two for severing the strip and for movement out of the said path to permit the forward end of the continuous strip to be engaged and drawn forward by the blank-feeding means between severing operations.

4. Apparatus of the character described comprising means for longitudinally feeding a continuous strip of stock, a cutting bar adapted to underlie the stock, a cutter adapted to act against said bar to sever the strip, and means for thrusting the bar under the strip, actuating the cutter thereon to sever the strip, and withdrawing the bar to one side of the strip.

5. Apparatus of the character described comprising means for longitudinally feeding a continuous strip of stock, means for severing successive blanks therefrom, and feeding means for the blank timed with the severing means and adapted to step the blank ahead of the continuous strip, the blank feeding means being so positioned with relation to the continuous-strip-feeding means as to provide a suspended reach of stock between the two and to receive the leading end of the continuous strip upon the severing of a blank therefrom, and said severing means comprising a cutter adapted to sever the strip in the region of the said suspended reach.

6. Apparatus of the character described comprising means for longitudinally feeding a continuous strip of stock, means for severing successive blanks therefrom, and feeding means for the blank adapted to step it ahead of the continuous strip, the blank feeding means being so positioned with relation to the continuous-strip-feeding means as to provide a suspended reach of stock between the two and to receive the leading end of the continuous strip upon the severing of a blank therefrom, and said severing means comprising a cutter bar, means for thrusting the same lengthwise from the side of the strip into a transverse position under the suspended reach of the strip and for similarly withdrawing it therefrom, a cutter, and means for actuating the cutter against said bar to sever the strip.

7. Apparatus of the character described comprising means for longitudinally feeding a continuous strip of stock, means for severing successive blanks therefrom, and feeding means for the blank adapted to step it ahead of the continuous strip, said severing means comprising a cutter bar, a cutter, means for actuating the cutter against said bar, and means adapted to thrust the bar lengthwise, from the side of the strip, into a transverse position under the strip, then to move it forward under the strip for the severing operation, then to tilt it on its own axis and to turn it on an axis substantially normal to the plane of the strip to disengage it from the severed material, and then to withdraw it lengthwise to a position at the side of the strip for a repetition of the cycle.

8. Apparatus of the character described comprising means for longitudinally feeding a continuous strip of stock, means for severing successive blanks therefrom, and feeding means for the blank adapted to step it ahead of the continuous strip, said severing means comprising a frame at the side of the strip movable in a direction generally parallel with the strip, a cutter-bar-support mounted on said frame to slide in a direction transverse to the strip, and a cutter bar mounted on said support.

9. Apparatus of the character described comprising means for longitudinally feeding a continuous strip of stock, means for severing successive blanks therefrom, and feeding means for the blank adapted to step it ahead of the continuous strip, said severing means comprising a cutter-bar-support mounted at one side of the strip for movement in a direction transverse to the strip, a cutter bar mounted on said support and adapted to be thrust lengthwise under the strip and likewise withdrawn therefrom by such movement of the support, said bar being pivoted on said support, yielding means for urging the bar about its pivot, means for latching the bar against the force of said yielding means, means for setting the bar in latched condition at one part of its range of movement, and means for tripping the latching means at another part of its range of movement.

10. Apparatus of the character described comprising means for longitudinally feeding a continuous strip of stock, means timed with said feeding means for severing blanks from said strip, and means timed with the feeding means and the severing means for mounting the blanks upon mandrels, the last said means comprising a conveyor adapted to convey the blanks from the severing position and means for rolling a mandrel transversely over said conveyor to pick up the blank in the form of a wound tube thereon.

11. Apparatus of the character described comprising means for longitudinally feeding a continuous strip of stock, means timed with said feeding means for severing blanks from said strip, and means timed with the feeding means and the severing means for mounting the blanks upon mandrels, the last said means comprising a conveyor adapted to convey the blanks in spaced-apart relation from the severing position and means for rolling a mandrel transversely over said conveyor to pick up the blank in the form of a wound tube thereon.

12. Apparatus of the character described comprising a conveyor adapted to feed forward longitudinally a continuous strip of stock, means for severing blanks from the strip adjacent the delivery end of said conveyor, an endless-belt conveyor adapted to carry the severed blanks away from the severing position, means for intermittently driving the two conveyors in such time relation as to step each blank ahead of the next and to stop the second conveyor with one after another of the blanks in the same determinate position, and means for propelling successive mandrels across the endless belt conveyor to pick up the blanks therefrom as wound tubes upon the respective mandrels.

13. A tube-rolling device comprising an endless blank-supporting conveyor belt, and an apron suspended by its margins under the upper reach of said belt in position to support the same.

14. A tube-rolling device comprising an endless blank-supporting conveyor belt, an apron suspended by its margins under the upper reach of said belt in position to support the same, and means for rolling a mandrel over said belt to wind onto the mandrel a blank of stock supported on the belt.

15. Tube-rolling apparatus comprising a support for a blank stock, means for rolling a mandrel over said support to wind the blank onto the mandrel, and means for tightening the blank by backward movement of a part of the blank applied to the mandrel, with relation to the nearest part of the support, in the course of the rolling operation.

16. Tube-rolling apparatus comprising a support for a blank of stock, means for rolling a mandrel over said support to wind the blank onto the mandrel, and means for drawing the mandrel backward, as an interruption of the rolling operation, to tighten the blank.

17. Tube-rolling apparatus comprising a support for a blank of stock, means for rolling a mandrel over said support to wind the blank onto the mandrel, means for drawing the mandrel backward, as an interruption of the rolling operation, to tighten the blank, and means for anchoring the far margin of the blank for the tightening operation by clamping it against the support.

18. Tube-rolling apparatus comprising a support for a blank of stock, means for rolling a mandrel over said support to wind the blank onto the mandrel, means for anchoring the far margin of the blank, and a set of jaws adapted to grasp the mandrel and move it backward, as an interruption of the rolling operation, to stretch the blank between the mandrel and the said anchoring means.

19. Tube-rolling apparatus comprising an endless belt conveyor, means for determinately positioning successive blanks of stock thereon, means for driving said conveyor and stopping it with one after another of the blanks in a determinate tube-rolling position, and means at said position and timed with the endless belt conveyor for winding the blanks onto successive mandrels.

20. Tube-rolling apparatus comprising means for presenting successive blanks of stock in a determinate position and there supporting them in flat, spread condition, means for presenting successive mandrels in a determinate adjacent position, means for propelling the mandrels over the blank-supporting means to wind the successive blanks thereon, and means interconnecting the several aforesaid means for actuating them in timed relation.

21. Tube-rolling apparatus comprising a support for a blank of stock, means for peripherally driving a mandrel to roll it over the said support to wind the blank onto the mandrel, means for lifting the said mandrel-driving means at a determinate part of the rolling operation, and means for drawing back the mandrel without rotation thereof, while the said driving means is lifted, to straighten out the unwound portion of the blank.

22. Tube-rolling apparatus comprising a support for a blank of stock, means for rolling a mandrel thereover to wind the blank upon the mandrel, and means adapted to lift from the support and effect removal from the apparatus of the mandrel with the blank wound thereon, without intervention of the operator.

23. Tube-rolling apparatus comprising a support for a blank of stock, an endless, orbital member adapted peripherally to drive a mandrel to roll it over the support and thereby cause it to pick up the blank, gripper jaws adapted to grasp the mandrel, and means for raising and lowering the said orbital member and for actuating and moving the jaws in timed relation.

24. In tube-rolling apparatus the combination of means for presenting successive blanks of stock at a determinate position, a set of gripper jaws, and means for moving the jaws along a blank so presented and for actuating the jaws to cause them to grasp and release a mandrel associated with the blank.

25. In tube-rolling apparatus the combination of means for supporting a blank of stock at a determinate position, a set of mandrel-manipulating jaws, and means for actuating said jaws to open and close them and to move them in a determinate cycle with relation to the blank and in timed relation to their opening and closing movements.

26. In tube-making apparatus the combination of means for supporting a blank of stock in a determinate position, a frame mounted for vertical movement over said position, a slide mounted for horizontal movement on said frame, mandrel-grasping means mounted on said slide, and means for vertically moving said frame, horizontally moving said slide and actuating said mandrel-grasping means in a determined cycle of operations.

27. In tube-rolling apparatus the combination of means for supporting a blank of stock, an endless, orbital member adapted peripherally to drive a mandrel to roll it over a blank so supported, means for driving said orbital member, and means for raising and lowering said orbital member.

28. In tube-rolling apparatus the combination of means for supporting a blank of stock, a caterpillar-tread device adapted to roll a mandrel on a blank so supported, and means for driving said caterpillar-tread device.

29. Tube-rolling apparatus comprising a support for a blank of stock, means at one side thereof for guiding a mandrel onto a blank mounted on said support, means for rolling the mandrel over the support to pick up the blank as a wound tube upon the mandrel, and disposing means at the other side of the support adapted to receive the mandrel and tube from the rolling means.

30. Tube-rolling apparatus comprising means for presenting blanks of stock in timed succession at a determinate position, a mandrel-chute at one side of said position and adapted to guide a series of mandrels onto successive blanks in said position, means for stopping the mandrel at a determinate position with relation to the blank, vertically movable means adapted to be brought down upon the mandrel to roll it over the blank, and means for concurrently withdrawing said stopping means from the path of the mandrel.

31. Tube-rolling apparatus comprising an endless carrier belt, means for placing successive blanks of stock in determinate relation upon said belt, means for intermittently driving said belt and stopping it with one after another of the blanks in the same determinate position, and means for propelling successive mandrels on the successive blanks to wind them upon the mandrels.

32. Tube-rolling apparatus comprising a blank-conveyor, means for placing successive blanks of stock in determinate relation thereon, means for delivering successive mandrels to the successive blanks, means for winding the successive blanks onto the respective mandrels, means for disposing of the resulting assemblies, and driving means for the several said means adapted to effect their complete operation in timed relation without intervention of an operator.

33. In tube-rolling apparatus the combination of a support for a blank of stock, means for grasping a mandrel partly rolled onto a blank on said support and drawing it backward to tighten said blank, and means for anchoring the far margin of the blank against the pull of the mandrel, said anchoring means comprising a roll mounted to roll over the support and onto the blank thereon, and means for running said roll onto and off of the blank in timed relation to the action of the mandrel-grasping means.

34. In tube-rolling apparatus the combination of a blank-conveyor, a carriage mounted for movement along said conveyor, and tube-rolling means mounted on said carriage and so constructed and arranged as to roll a mandrel transversely upon the conveyor to pick up a blank therefrom as a wound tube upon the mandrel.

35. In an apparatus for making rubber tubes, two feeders adapted to feed a continuous sheet of compounded rubber material, said feeders being movable at the same time and at the same speed to advance an end portion of the sheet, automatic cutting means whereby said end portion is severed from the sheet, and operating means whereby one of said feeders is actuated independently of the other to provide a space between the continuous sheet and the portion severed therefrom, said automatic cutting means including a cutter adapted to be driven by said operating means, and an automatic timing device through which motion is transmitted to said cutter.

36. In an apparatus for making rubber tires, two feeders adapted to feed a continuous sheet of compounded rubber material, said feeders being movable at the same time and at the same speed to advance an end portion of the sheet, operating means including an intermittent driving device whereby an intermittent motion is transmitted to said feeders, automatic cutting means whereby end portions are severed from the sheet while said feeders are at rest, said cutting means including a cutter adapted to be driven by said operating means, and an automatic timing device through which motion is transmitted to said cutter when said feeders are at rest.

37. Strip feeding apparatus comprising a conveyor for feeding longitudinally from its delivery end a strip of material, means for driving the same in intermittent movements, a second conveyor for receiving strip material fed longitudinally from the first conveyor, means for driving the second conveyor in intermittent movements longer but of the same speed as the movements of the first conveyor, and means for automatically cutting a blank from a portion of the strip which has left the delivery end of the first conveyor during the time said conveyors are both inactive.

38. Strip feeding apparatus comprising a conveyor for feeding longitudinally from its delivery end a strip of material, means for driving the same in intermittent movements, a second conveyor for receiving strip material fed longitudinally from the first conveyor, means for driving the second conveyor in intermittent movements longer but of the same speed as the movements of the first conveyor, and means for automatically cutting a blank from a portion of the strip which has left the delivery end of the first conveyor during the time said conveyors are both inactive, said driving means for said second conveyor being arranged to operate said second conveyor after the cutting operation and slightly prior to the renewal of the operation of the first conveyor whereby the blanks automatically cut from said sheet are fed forward in spaced relation on said second conveyor from the cutting means.

39. Tube making apparatus comprising means for feeding forward a continuous strip of sheeted rubber stock to a receiving position, means for feeding to a tube rolling position successive blanks severed from the continuous strip at the severing position, and means for automatically severing the portion of the strip fed from the delivery end of said first feeding means during periods of time when both of said feeding means are inoperative, the second feeding means being arranged to step each blank ahead of the next as it feeds the blank from the severing position and to support the blanks successively in position for the rolling of the mandrels thereon.

In witness whereof I have hereunto set my hand this 4th day of January, 1926.

HARVEY L. YOUNG.